(12) United States Patent
Bartley et al.

(10) Patent No.: US 11,742,156 B2
(45) Date of Patent: Aug. 29, 2023

(54) ULTRACAPACITOR MODULE WITH IMPROVED VIBRATION RESISTANCE

(71) Applicant: KYOCERA AVX Components Corporation, Fountain Inn, SC (US)

(72) Inventors: Shelby Bartley, Simpsonville, SC (US); Jeffrey Cain, Greenville, SC (US); Joseph M. Hock, Surfside Beach, SC (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 0 days.

(21) Appl. No.: 17/510,636

(22) Filed: Oct. 26, 2021

(65) Prior Publication Data

US 2022/0130622 A1   Apr. 28, 2022

Related U.S. Application Data

(60) Provisional application No. 63/105,400, filed on Oct. 26, 2020.

(51) Int. Cl.
*H01G 11/82* (2013.01)
*H01G 11/10* (2013.01)
*H01G 11/14* (2013.01)

(52) U.S. Cl.
CPC .............. *H01G 11/82* (2013.01); *H01G 11/10* (2013.01); *H01G 11/14* (2013.01)

(58) Field of Classification Search
CPC ...................................................... H01G 11/10
See application file for complete search history.

(56) References Cited

U.S. PATENT DOCUMENTS

| 2006/0203429 A1* | 9/2006 | Thrap | H01M 50/502 |
| | | | 361/502 |
| 2007/0008678 A1* | 1/2007 | Fresard | H01G 11/70 |
| | | | 361/502 |

(Continued)

FOREIGN PATENT DOCUMENTS

| CN | 204045404 | 12/2014 |
| CN | 104319111 | 1/2015 |

(Continued)

OTHER PUBLICATIONS

American Bureau of Shipping, Use of Supercapacitors in the Marine and Offshore Industries, Dec. 2017, retrieved Jan. 26, 2022. http://ww2.eagle.org/content/dam/eagle/rules-and-guides/current/other/288_supercapacitors_2017/supercapacitors_guide_e-Dec17.pdf pp. 15-19.

(Continued)

*Primary Examiner* — Eric W Thomas
(74) *Attorney, Agent, or Firm* — Dority & Manning, P.A.

(57) ABSTRACT

An ultracapacitor module is disclosed. The ultracapacitor module comprises: an enclosure, and a plurality of ultracapacitors housed within the enclosure wherein at least one ultracapacitor of the plurality of ultracapacitors is secured to the enclosure. The ultracapacitor module satisfies one or more of the following conditions upon being subjected to a vibration profile in accordance with ISO 16750-3-2012, Table 12 and IEC 60068-2-64: a capacitance within a rated capacitance value as determined in accordance IEC 62391-1, Method 1A, an equivalent series resistance within a rated equivalent series resistance value as determined in accordance IEC 62391-1, a leakage current within a rated leakage current value as determined in accordance IEC 62391-1, an operating voltage with a rated operating voltage value.

25 Claims, 7 Drawing Sheets

(56) References Cited

U.S. PATENT DOCUMENTS

| | | | |
|---|---|---|---|
| 2007/0020513 A1* | 1/2007 | Medina | B60L 58/26 |
| | | | 429/120 |
| 2007/0253146 A1* | 11/2007 | Inoue | H01G 9/08 |
| | | | 361/328 |
| 2008/0068801 A1* | 3/2008 | Wilk | H01G 11/76 |
| | | | 361/811 |
| 2010/0134974 A1* | 6/2010 | Nguyen | H01G 9/155 |
| | | | 361/689 |
| 2010/0265660 A1 | 10/2010 | Nguyen et al. | |
| 2014/0242436 A1 | 8/2014 | Pyzza et al. | |
| 2014/0328008 A1 | 11/2014 | Honda et al. | |
| 2015/0236311 A1 | 8/2015 | Ambrosio et al. | |

FOREIGN PATENT DOCUMENTS

| | | |
|---|---|---|
| CN | 111584253 | 8/2020 |
| KR | 2020170002905 | 8/2017 |
| WO | WO-2021039551 A1 * | 3/2021 |

OTHER PUBLICATIONS

International Search Report and Written Opinion for PCT/US2021/056618 dated Feb. 16, 2022, 11 pages.

* cited by examiner

ULTRACAPACITOR MODULE WITH IMPROVED VIBRATION RESISTANCE

CROSS-REFERENCE TO RELATED APPLICATION

The present application claims filing benefit of U.S. Provisional Patent Application Ser. No. 63/105,400 having a filing date of Oct. 26, 2020, and which is incorporated herein by reference in its entirety.

BACKGROUND OF THE INVENTION

Ultracapacitor modules are usually enclosed within an enclosure. When utilized for an end-use application, such ultracapacitor modules may be exposed to challenging environmental conditions and thus undergo shock and/or vibration. In certain circumstances, such shock and/or vibration may result in failure of the ultracapacitor module. Such failure may be, but is not limited to, mechanical failure and/or performance failure. For instance, the shock and/or vibration may result in breakage of the enclosure or any other components utilized in the ultracapacitor module, unfastening of any fasteners, the disconnect of any electrical connections, etc. Such shock and/or vibration may also result in the detrimental performance of the ultracapacitors and/or any circuit boards or balancing circuits associated with such ultracapacitors. While attempts have been made to address such concern, deficiencies still remain. For instance, simply damping elements may be provided; however, they may not provide the adequation stability over a longer duration of time. In addition, they may be difficult to insert within certain areas or locations of the ultracapacitor module. Because of such deficiencies, the ultracapacitor module must be repaired or replaced on a continuous basis. As a result, a need currently exists for an improved ultracapacitor module that is capable of withstanding certain thresholds of shock and vibration.

SUMMARY OF THE INVENTION

In accordance with one embodiment of the present invention, an ultracapacitor module is disclosed. The ultracapacitor module comprises: an enclosure and a plurality of ultracapacitors housed within the enclosure wherein at least one ultracapacitor of the plurality of ultracapacitors is secured to the enclosure. The ultracapacitor module satisfies one or more of the following conditions upon being subjected to a vibration profile in accordance with ISO 16750-3-2012, Table 12 and IEC 60068-2-64: a capacitance within a rated capacitance value as determined in accordance IEC 62391-1, Method 1A, an equivalent series resistance within a rated equivalent series resistance value as determined in accordance IEC 62391-1, a leakage current within a rated leakage current value as determined in accordance IEC 62391-1, an operating voltage with a rated operating voltage value.

In accordance with another embodiment of the present invention, a vehicle incorporating the aforementioned ultracapacitor module is disclosed. The vehicle is a transportation vehicle, an industrial vehicle, or a military vehicle.

In accordance with another embodiment of the present invention, a robot incorporating the aforementioned ultracapacitor module is disclosed.

In accordance with another embodiment of the present invention, an ultracapacitor module is disclosed. The ultracapacitor module comprises: an enclosure including a top enclosure member and a bottom enclosure member connected to each other via at least one interlocking mechanism and a plurality of ultracapacitors housed within the enclosure, wherein at least one of the top enclosure member and the bottom enclosure member includes at least one individual opening through which at least one ultracapacitor is provided wherein the at least one ultracapacitor contacts the perimeter of such opening.

In accordance with another embodiment of the present invention, a vehicle incorporating the aforementioned ultracapacitor module is disclosed. The vehicle is a transportation vehicle, an industrial vehicle, or a military vehicle.

In accordance with another embodiment of the present invention, a robot incorporating the aforementioned ultracapacitor module is disclosed.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Figure 1:
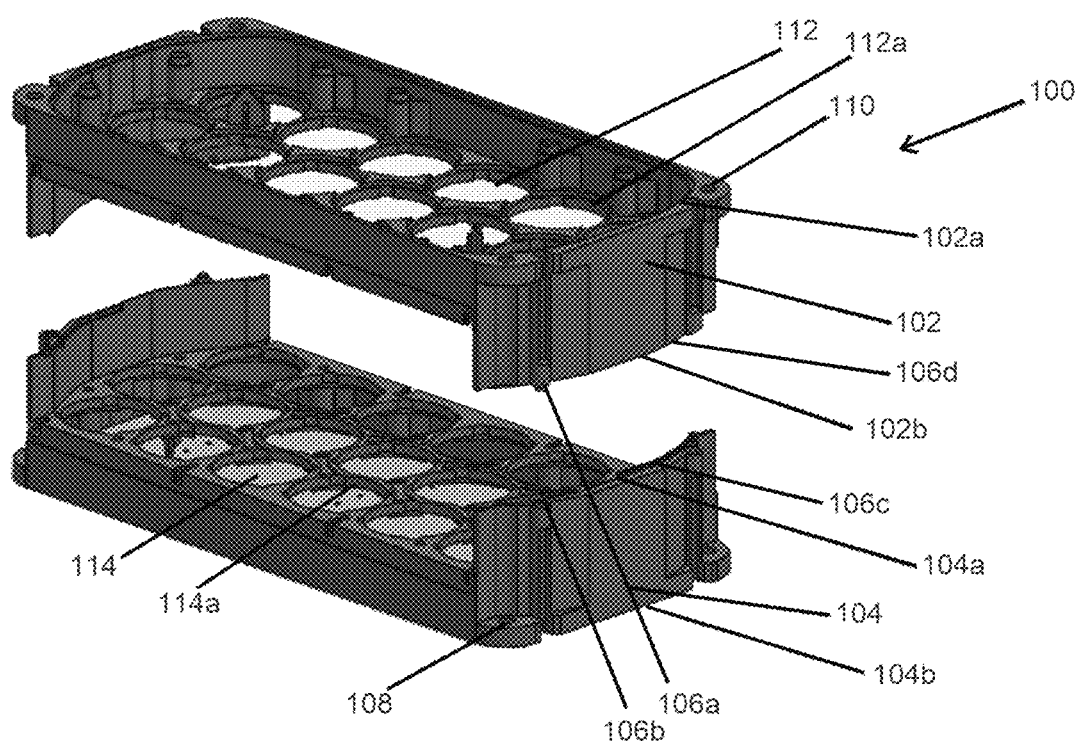
FIG. 1 illustrates an embodiment of an enclosure of an ultracapacitor module.

Repeat use of reference characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to an ultracapacitor module. The ultracapacitor module includes a plurality of ultracapacitors and an enclosure for housing the plurality of ultracapacitors. At least one of the plurality of ultracapacitors is secured to the enclosure. The present inventors have discovered that the manner in which the ultracapacitor module is configured, including the means of attachment or securing of the various components and/or sealing, can minimize the effects due to shock or vibration. In this regard, the present inventors have discovered an ultracapacitor module that is able to maintain its structural integrity and performance when subjected to shock or vibration.

For instance, when utilized in certain end-use applications, the ultracapacitor module may undergo challenging environmental conditions. In particular, the ultracapacitor module may undergo shock and/or vibration which can potentially affect the stability, structural integrity, and/or performance of the ultracapacitors and module. However, the present inventors have discovered that the ultracapacitor module as disclosed herein can minimize any effects due to such shock and/or vibration thereby allowing for the ultracapacitor module to continue to operate. In particular, the present inventors have discovered that the ultracapacitor module can pass one or more performance tests upon being subjected to the vibration profile as specified in accordance with ISO 16750-3-2012, Table 12 and IEC 60068-2-64. The profile is conducted for 32 hours, under a root mean square acceleration of 57.9 m/s$^2$, and the frequency and power spectral density values as indicated in Table 12 of such test and provided herein: 10 Hz-18 (m/s$^2$)$^2$/Hz; 20 Hz-36 (m/s$^2$)$^2$/Hz; 30 Hz-36 (m/s$^2$)$^2$/Hz; 180 Hz-1 (m/s$^2$)$^2$/Hz; 2000 Hz-1 (m/s$^2$)$^2$/Hz.

In one embodiment, after being subjected to the vibration profile mentioned above, the ultracapacitor module may undergo certain performance tests. In this regard, the ultracapacitor module may pass one or more of such performance tests even after undergoing such shock and vibration. These performance tests may be based on the capacitance, equivalent series resistance, leakage current, operating voltage, and/or energy storage of the ultracapacitor module.

For instance, upon being subjected to the vibration profile, the ultracapacitor module of the present invention may satisfy the minimum and maximum capacitance values as rated on the ultracapacitor module product specification. As generally known in the art, such capacitance values may vary depending on various factors, such as the make-up of the ultracapacitors, number of ultracapacitors, connection of ultracapacitors, etc. Accordingly, such minimum and maximum values may vary among ultracapacitor modules. Nevertheless, the present invention provides that even after being subjected to the vibration profile, the ultracapacitor module exhibits a capacitance within the rated capacitance values of the ultracapacitor module. As an example, an ultracapacitor module may have a minimum capacitance. In this regard, upon being subjected to the vibration profile, the ultracapacitor module may exhibit a capacitance at or above the minimum rated value. In general, the capacitance may be determined in accordance with IEC 62391-1, Method 1A.

Similarly, upon being subjected to the vibration profile, the ultracapacitor module of the present invention may satisfy the minimum and maximum equivalent series resistance values as rated on the ultracapacitor module product specification. As generally known in the art, such equivalent series resistance values may vary depending on various factors, such as the make-up of the ultracapacitors, number of ultracapacitors, connection of ultracapacitors, etc. Accordingly, such minimum and maximum values may vary among ultracapacitor modules. Nevertheless, the present invention provides that even after being subjected to the vibration profile, the ultracapacitor module exhibits an equivalent series resistance within the rated equivalent series resistance values of the ultracapacitor module. As an example, an ultracapacitor module may have a maximum equivalent series resistance. In this regard, upon being subjected to the vibration profile, the ultracapacitor module may exhibit an equivalent series resistance at or below the minimum rated value. In general, the equivalent series resistance may be determined in accordance with IEC62931-1.

Further, upon being subjected to the vibration profile, the ultracapacitor module of the present invention may satisfy the minimum and maximum leakage current values as rated on the ultracapacitor module product specification. As generally known in the art, such leakage current values may vary depending on various factors, such as the make-up of the ultracapacitors, number of ultracapacitors, connection of ultracapacitors, etc. Accordingly, such minimum and maximum values may vary among ultracapacitor modules. Nevertheless, the present invention provides that even after being subjected to the vibration profile, the ultracapacitor module exhibits a leakage current within the rated leakage current values of the ultracapacitor module. As an example, an ultracapacitor module may have a maximum leakage current. In this regard, upon being subjected to the vibration profile, the ultracapacitor module may exhibit a leakage current at or below the minimum rated value. In general, the leakage current may be determined in accordance with IEC62931-1.

Also, upon being subjected to the vibration profile, the ultracapacitor module of the present invention may satisfy the rated voltage on the ultracapacitor module product specification. As generally known in the art, such rated voltage may vary depending on various factors, such as the make-up of the ultracapacitors, number of ultracapacitors, connection of ultracapacitors, etc. Accordingly, such rated voltage may vary among ultracapacitor modules. Nevertheless, the present invention provides that even after being subjected to the vibration profile, the ultracapacitor module exhibits a voltage approximate the rated voltage of the ultracapacitor module. As an example, an ultracapacitor module may have a certain rated voltage (e.g., output voltage). In this regard, upon being subjected to the vibration profile, the ultracapacitor module may exhibit a voltage approximate such rated voltage. By approximate, the value should be within 5%, such as within 3%, such as within 1% or the rated voltage.

In addition, upon being subjected to the vibration profile, the ultracapacitor module of the present invention may satisfy the minimum and maximum operating voltage values as rated on the ultracapacitor module product specification. As generally known in the art, such operating voltage values may vary depending on various factors, such as the make-up of the ultracapacitors, number of ultracapacitors, connection of ultracapacitors, etc. Accordingly, such minimum and maximum values may vary among ultracapacitor modules. Nevertheless, the present invention provides that even after being subjected to the vibration profile, the ultracapacitor module exhibits an operating voltage within the rated operating voltage values of the ultracapacitor module. As an example, an ultracapacitor module may have an operating voltage range. In this regard, upon being subjected to the vibration profile, the ultracapacitor module may exhibit an operating voltage within the rated range.

Further, upon being subjected to the vibration profile, the ultracapacitor module of the present invention may satisfy the rated energy storage on the ultracapacitor module product specification. As generally known in the art, such rated energy storage may vary depending on various factors, such as the make-up of the ultracapacitors, number of ultracapacitors, connection of ultracapacitors, etc. Accordingly, such rated energy storage may vary among ultracapacitor modules. Nevertheless, the present invention provides that even after being subjected to the vibration profile, the ultracapacitor module exhibits an energy storage within the rated energy storage of the ultracapacitor module.

In addition, upon being subjected to the vibration profile, the ultracapacitor module of the present invention may undergo visual inspection and pass such test. For instance, the structural integrity of the ultracapacitor module should survive the vibration. In this regard, the ultracapacitor module should not break and there should not be any apparent damage. For instance, there should not be any malfunctions or breaks due to the vibration. In certain embodiments, to properly visually inspect the ultracapacitor module, it may be disassembled, for instance after having conducted any of the aforementioned electrical tests to determine electrical performance, to assess the mechanical integrity of the module. During this assessment, if any of the components have cracked, material has worn away, adhesive bonding/sealants have broken loose, and/or other mechanical issues are observed, this may indicate failure of the ultracapacitor module in accordance with the vibration test.

As indicated above, upon being subjected to the vibration profile, the ultracapacitor module may also be able to satisfy one or more of the following tests as mentioned above: capacitance, equivalent series resistance, leakage current, rated voltage, and/or operating voltage. In this regard, the ultracapacitor module may be able to satisfy at least 1, such as at least 2, such as at least 3, such as at least 4, such as all 5 of the aforementioned tests.

As determined according to such test, the ultracapacitor module demonstrates stability and vibration robustness as indicated by no breakage while also maintaining performance. In one embodiment, such test(s) can also be passed when the ultracapacitor module is tested on 2 different orientations. In one particular embodiment, such test(s) can be passed when the ultracapacitor module is tested on 3 different orientations. Furthermore, as specified above, upon completion of the vibration, the ultracapacitor module may also be able to satisfy one or more of the following tests as mentioned above. In this regard, the ultracapacitor module may be able to satisfy at least 1, such as at least 2, such as at least 3, such as at least 4, such as all 5 of the aforementioned tests even after being subjected to the vibration profile on 2 different orientations. In one embodiment, the ultracapacitor module may be able to satisfy at least 1, such as at least 2, such as at least 3, such as at least 4, such as all 5 of the aforementioned tests even after being subjected to the vibration profile on 3 different orientations.

In this regard, the ultracapacitor module and connections, securements, dampenings, and/or sealings within the ultracapacitor module, such as those associated with the enclosure (e.g., between the enclosure members, between the cover layers and the enclosure members, etc.), between the ultracapacitors and the enclosure (e.g., between the ultracapacitors and the enclosure members, between the ultracapacitors and the cover layers, etc.), and/or between the interconnects and the cover layers, are mechanically stable, in particular against vibration loads, thereby maintaining the structural integrity of the ultracapacitor module.

In addition, such vibration robustness and minimization of effects due to shock and vibration may be realized over a wide temperature range, such as from −40° C. to 65° C. In this regard, such minimization may be realized at a temperature of −40° C. or more, such as −30° C. or more, such as −20° C. or more, such as −10° C. or more, such as 0° C. or more, such as 10° C. or more, such as 20° C. or more, such as 25° C. or more, such as 30° C. or more. In addition, such minimization may be realized at a temperature of 65° C. or less, such as 60° C. or less, such as 50° C. or less, such as 40° C. or less, such as 30° C. or less, such as 25° C. or less, such as 20° C. or less, such as 10° C. or less, such as 0° C. or less.

Furthermore, while the ultracapacitor module may be designed to endure vibration and shock, it may also be desired to endure other conditions as well. For instance, as indicated below, the structure and sealing mechanisms may decrease or minimize the amount of contaminants that may enter the ultracapacitor module and thereby affect its performance. These contaminants may include dust, water vapor, liquids, and the like. Thus, by providing the appropriate ultracapacitor module configuration and respective seals, other benefits may also be realized by the present invention.

Various embodiments of the present invention will now be described in more detail.

Enclosure

Referring to FIGS. 1-8 and 13, the ultracapacitor module 200 includes an enclosure 100 for housing the plurality of ultracapacitors 202. In particular, the enclosure 100 includes a top enclosure member 102 and a bottom enclosure member 104. The enclosure members may be made from any material known in the art that can provide the module and enclosure with structural integrity. In this regard, in one embodiment, the enclosure members may be made from a metal. The metal may include, but is not limited to, silver, copper, gold, aluminum, molybdenum, zinc, lithium, tungsten, nickel, iron, palladium platinum, tin, an alloy thereof, or a combination thereof. Alloys may include, but are not limited to, steel (e.g., stainless steel), brass, bronze, etc. In one embodiment, a metal such as aluminum, in particular anodized aluminum may be utilized. In another embodiment, the enclosure members may be made from a polymer. For example, the polymer may be a thermoplastic or a thermoset. In one particular embodiment, the polymer may be a thermoplastic polymer. For example, the thermoplastic polymer may include, but is not limited to, a polyolefin (e.g., polyethylene, polypropylene, etc.), a polyamide (e.g., nylon), a styrene (e.g., polystyrene, acrylonitrile butadiene styrene), an acrylic (e.g., polymethyl methacrylate), a polycarbonate, a polyetherketone, a polyarylene sulfide, a polyacetal, etc. In particular, the thermoplastic polymer may be one that is capable of being molded (e.g., injection molded, blow molded, etc.). In addition, the thermoplastic polymer may have a melting temperature of 30° C. or more, such as 40° C. or more, such as 50° C. or more, such as 75° C. or more, such as 100° C. or more, such as 125° C. or more, such as 150° C. or more, such as 200° C. or more. In this regard, the thermoplastic polymer may generally be a high performance polymer. In one embodiment, both enclosure members may be made from the same type of material. However, it should be understood that the enclosure members may also be made from different types of material.

The top enclosure member 102 and the bottom enclosure member 104 may be connected to each other using an interlocking mechanism, such as a mechanical interlocking mechanism. Without intending to be limited by theory, the interlocking mechanism may contribute to the structural integrity of the enclosure and module. Furthermore, the enclosure members may include a plurality of interlocking mechanisms. For instance, the enclosure members may include at least 1, such as at least 2, such as at least 3, such as at least 4, such as at least 5 individual interlocking mechanisms. However, it should be understood that the enclosure members may include even more interlocking mechanisms to assist with the structural integrity of the enclosure and module.

As one example, the interlocking mechanism may include a male/female interlocking mechanism, such as a pin/receiving hole mechanism. For instance, the interlocking mechanism may include a pin 106a and a receiving hole 106b. In one embodiment, the top enclosure member 102 may include a pin 106a while the bottom enclosure member 104 may include a receiving hole 106b. In addition, the top enclosure member 102 may also include a receiving hole 106b while the bottom enclosure member 104 may include a pin 106a. In this regard, each of the top and bottom enclosure members may both include a respective pin 106a and receiving hole 106b. When the top and bottom enclosure members both include a respective pin and receiving hole, they may be provided on the same side of the enclosure and offset from one another. For instance, one of such mechanisms may be provided proximate to one corner of the enclosure while the other mechanism may be provided proximate to the opposing corner on the same side of the enclosure. In addition, the opposing side of the enclosure may also include the same configuration of interlocking mechanisms.

The interlocking mechanism may include a tongue and groove mechanism. For instance, the bottom enclosure member 104 may include a tongue portion 106c while the top enclosure member 102 may include a groove portion 106d. Alternatively, the top enclosure member 102 may include a tongue portion 106c while the bottom enclosure member 104 may include a groove portion 106d. In addition, each of the top and bottom enclosure members may both include a respective tongue portion 106c and groove portion 106d. When the top and bottom enclosure members both include a respective tongue and groove mechanism, they may be provided on the same side of the enclosure and offset from one another. For instance, one of such mechanisms may be provided proximate to one corner of the enclosure while the other mechanism may be provided proximate to the opposing corner on the same side of the enclosure. In addition, the opposing side of the enclosure may also include the same configuration of interlocking mechanisms.

While the aforementioned identifies two types of interlocking mechanisms, it should be understood that other types of interlocking mechanisms may also be utilized according to the present invention. These may include integral features, such as features generated or produced upon molding or creating the members. For example, these may include snap hooks, tongue/groove mechanisms as mentioned above, and others. In addition, other types of fasteners may include the use of threaded studs, rivets, and the like. Furthermore, in addition to these interlocking mechanisms, an adhesive may be utilized to adhere the top enclosure member to the bottom enclosure member. The adhesive may be provided at various points of contact between the enclosure members. For instance, the adhesive may be provided at one or more locations of the interlocking member. The adhesive may be provided along the perimeter of the point of contact between the top enclosure member and the bottom enclosure member.

At least one of the top enclosure member 102 and the bottom enclosure member 104 may also include individual openings 112, 114 for receiving the plurality of ultracapacitors. For instance, at least one of the top enclosure member 102 and the bottom enclosure member 104 may include at least one individual opening for an ultracapacitor of the plurality of ultracapacitors. However, it should be understood that at least 25%, such as at least 50%, such as at least 70%, such as at least 90%, such as 100% of the ultracapacitors may each receive an individual opening within the enclosure member.

In one embodiment, both the top enclosure member 102 and the bottom enclosure member 104 include such openings for receiving each of the plurality of ultracapacitors. In this regard, at least one, preferably both, enclosure members include a respective opening for each of the ultracapacitors present within the ultracapacitor module. In the top enclosure member, these openings 112 may be provided between the top edge 102a and the bottom edge 102b of the enclosure member 102. In the bottom enclosure member, these openings 114 may be provided between the top edge 104a and the bottom edge 104b of the bottom enclosure member 104.

The diameter of such openings may be the same as the diameter of the ultracapacitor, in particular the housing of the ultracapacitor, to allow the ultracapacitor to be received by such opening. In this regard, in one embodiment, the ultracapacitor may contact the perimeter of the openings 112, 114. However, it should be understood that the diameter of such opening may also be relatively greater than the diameter of the ultracapacitor, in particular the housing of the ultracapacitor. Regardless, the diameter of such openings may be 110% or less, such as 108% or less, such as 105% or less, such as 103% or less, such as 102% or less, such as 101% or less, such as 100.5% or less, such as 100.1% or less than the diameter of the ultracapacitor housing. The diameter of such openings may be 99% or more, such as 99.5% or more, such as 99.9% or more, such as 100% or more than the diameter of the ultracapacitor housing. Regardless, the diameter may be such that it allows for contact between the perimeter of such openings and the enclosure members and the respective ultracapacitors positioned within such openings.

Figure 2:
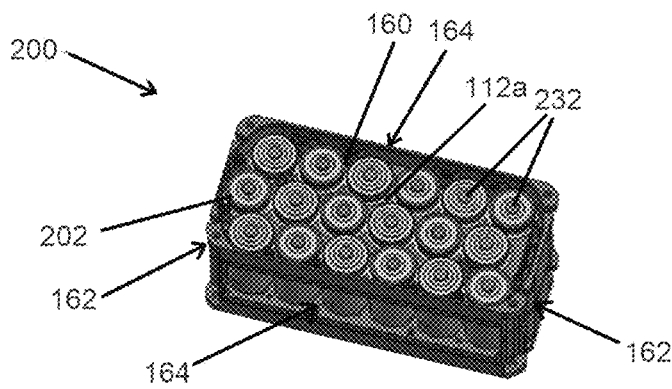
FIG. 2 illustrates a top and bottom view of an embodiment of an ultracapacitor module.
Figure 2:
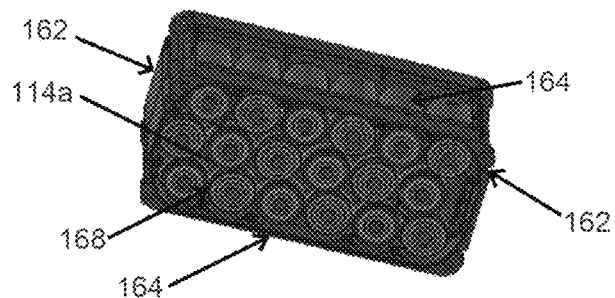

As indicated above, at least one of the ultracapacitors may contact the perimeter of the opening. Such contact between the ultracapacitor and the perimeter of the opening may assist in securing the ultracapacitor to the respective enclosure members. In one embodiment, more than one of the ultracapacitors may contact the perimeter of the housing. For instance, at least 25%, such as at least 50%, such as at least 70%, such as at least 90%, such as 100% of the ultracapacitors may contact the perimeter of the opening. In this regard, in one embodiment, such perimeter may be lined with a material 112a, 114a to promote adhesion or contact between the ultracapacitor and the opening and respective enclosure member as illustrated in FIGS. 1 and 2. It should be understood that such material may not be limited. For instance, in one embodiment, such material may be a mechanical mechanism to promote contact and stability of the ultracapacitors. For instance, such material may be a grip ring as generally understood in the art. In one embodiment, the perimeter may be lined with an adhesive. The adhesive utilized according to the present invention is not necessarily limited. For example, the adhesive may be compliant, not brittle, and resist cracking. In addition, the adhesive may be able to withstand the temperature range of operation of the ultracapacitor, in particular without degradation or altering behavior. The adhesive may be one that is capable of providing a good surface grip, even with vibration. The adhesive may be one that is able to set from liquid to solid in production conditions.

In this regard, the adhesive may be a non-reactive adhesive or a reactive adhesive. The adhesive may include a drying type adhesive, a pressure-sensitive adhesive, a contact adhesive, a hot melt adhesive, an anaerobic adhesive, etc. The adhesive may be a one-part adhesive or a multi-part adhesive. The adhesive, although not limited, may be one based off of acrylonitrile, cyanoacrylate, an acrylic, resorcinol, an epoxy, ethylene vinyl acetate, a polyamide, a polyethylene, a polypropylene, a polyurethane, a polyvinyl acetate, a polyvinyl chloride, a rubber cement, a silicone, a styrene acrylic copolymer, etc., or a mixture thereof. The adhesive may be a synthetic adhesive in one embodiment. In another embodiment, the adhesive may be a natural adhesive, such as an animal based adhesive, a plant based adhesive, or a mixture thereof.

In one embodiment, the perimeter may be lined with a rubber or rubber-like material. The rubber may be, but is not limited to, a silicone, a polyurethane, a styrene-butadiene, a nitrile, a butyl rubber, an elastomer (e.g., Neoprene®, a fluoroelastomer, etc.), a natural rubber (e.g., isoprene), an ethylene propylene diene monomer, etc. Regardless, the material should be one capable of withstanding the temperature of the ultracapacitors and ultracapacitor module when in use. Without intending to be limited by theory, such material may promote stability of the ultracapacitors within the module while also allowing for the dampening of any shock and/or vibration.

The top enclosure member 102 and/or the bottom enclosure member 104 may also include one or more mounting holes 108, 110. In one embodiment, both enclosure members include mounting holes. These mounting holes may allow for mounting of the ultracapacitor module to another surface, such as a surface associated with an end-use application. Typically, when provided, mounting holes are presented in accordance with industry standard mounting patterns. In this regard, each enclosure member may include at least 1, such as at least 2, such as at least 3, such as at least 4 mounting holes. The mounting holes may be presented along the top edge 102a of the top enclosure member 102. The mounting holes may be presented along the bottom edge 104b of the bottom enclosure member 104. In addition, the mounting holes may be presented along a corner of the respective enclosure member. The mounting hole may be of a shape and cross section for receiving a fastener, such as a screw or bolt.

Figure 3:
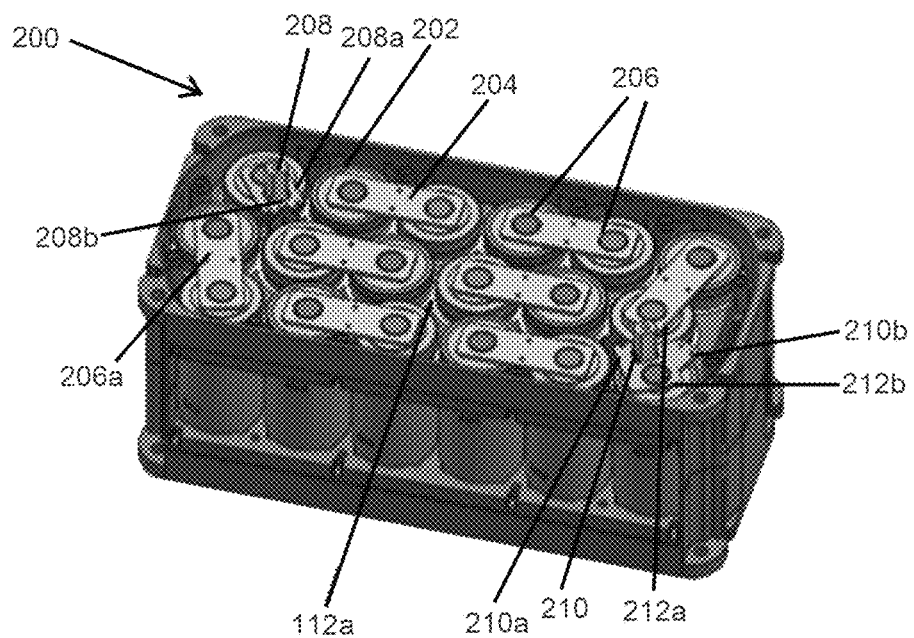
FIG. 3 illustrates a top view of an embodiment of an ultracapacitor module showing the ultracapacitor interconnects.

Once provided within the respective openings, the ultracapacitors may be connected using an interconnect 204 (also referred to as a bus bar) as illustrated in FIG. 3. While FIG. 3 illustrates interconnects 204 on a top surface of the ultracapacitors and module, it should be understood that interconnects may also be present on the bottom surface of the ultracapacitors and module. In addition, the ultracapacitors may be electrically connected together in series or in parallel, depending on the particular properties desired. For instance, in one embodiment, the ultracapacitors may be electrically connected in series such that a terminal of a certain polarity (e.g., positive) of one ultracapacitor is connected to a terminal of opposite polarity (e.g., negative) of another ultracapacitor. Alternatively, in one embodiment, the ultracapacitors may be connected in parallel.

The type of interconnect and material utilized according to the present invention is not necessarily limited by the present invention. For instance, the interconnect 204 may be formed from a variety of materials. The interconnect may comprise any suitable plastic, resin, metal, etc. so long as it is electrically conductive. In one embodiment, the interconnect is formed from a conductive material, such as a conductive metal. The conductive metal may include, but is not limited to, copper, tin, nickel, aluminum, etc., as well as alloys and/or coated metals. In one particular embodiment, the interconnect is formed from aluminum. In addition, in one embodiment, the interconnect may be relatively flat. Alternatively, the interconnect may be one having an increased surface area. Regarding the latter, the interconnect may have projections/protrusions or may also be formed from wires, braids, coils, etc.

Regardless, the ultracapacitors may be connected using an interconnect that attaches to or connects the respective terminals of the ultracapacitors. In this regard, the interconnect 204 includes voids 206 in which the terminals 232 of the ultracapacitors are positioned as illustrated in FIG. 3. The interconnect surrounds the terminal allowing for electrical connection. The interconnect may be welded, such as laser welded, to the terminal 232 of the ultracapacitors 202. However, it should be understood that other means may also be employed for connecting the interconnect to the terminals of the ultracapacitors. For instance, if the terminals have a screw configuration, the terminals may protrude through the voids of the interconnects whereby a nut could be utilized to connect the interconnect with the terminal and maintain structural integrity. It should be understood that in addition to the above, other means may also be utilized to secure the interconnect to the respective terminal.

Furthermore, as illustrated in FIG. 3, the ultracapacitor module may include an external termination 208, 210 for external connection for an end-use application. In particular, such external termination may be provided on the first and/or last ultracapacitor in the connection of ultracapacitors. Such external termination may protrude through any cover layers as indicated herein thereby allowing for electrical connection for an end-use application. In one embodiment, such external termination may not extend directly from a terminal of the ultracapacitor. Instead, a pedestal 208a, 210a may be utilized that includes the external terminations 208, 210 as illustrated in FIG. 3. The pedestal 208a, 210a is also electrically connected to the respective ultracapacitor terminal 232. In particular, the pedestal may also include a void, as indicated above with respect to the interconnects, for receiving the ultracapacitor terminal 232. The external terminations may then extend from the pedestal at a location adjacent the terminal of the ultracapacitor as illustrated in FIG. 3. In addition, the material of the pedestal and the manner in which the terminal is connected to the pedestal may also be the same as mentioned above with respect to the interconnects.

In one embodiment, an adhesive 212a may be provided between the interconnect 204 and the surface of the ultracapacitor 202. For example, an adhesive 212a may be provided between the interconnect and the top surface or bottom surface of the ultracapacitor. In particular, an adhesive may be provided around the perimeter of the terminal such that it contacts the ultracapacitor and the interconnect. In one embodiment, such adhesive may also contact the terminal of the ultracapacitor. In another embodiment, such adhesive may not contact the terminal of the ultracapacitor such that it is offset from the perimeter of the terminal. Similarly, in one embodiment, an adhesive 212b may be provided between the pedestal 208a, 210a and the surface of the ultracapacitor 202. For example, an adhesive 212b may be provided between the pedestal and the top surface of the ultracapacitor. Like the interconnect, the adhesive may be provided around the perimeter of the terminal such that it contacts the ultracapacitor and the pedestal. In one embodiment, such adhesive may also contact the terminal of the ultracapacitor. In another embodiment, such adhesive may not contact the terminal of the ultracapacitor such that it is offset from the perimeter of the terminal. Without intending to be limited by theory, such adhesive may be utilized to assist with dampening any vibration and maintaining the structural integrity of the ultracapacitor module.

In one embodiment, the interconnect may include holes 206a. Similarly, in one embodiment, the pedestal 208a, 210a may also include holes 208b. These holes 206a, 208b may be provided to receive rivets, screws, or other types of fasteners. For example, as mentioned below, such holes may be utilized to provide a further connection between a cover layer and the interconnects and/or pedestals and the ultracapacitors. Without intending to be limited by theory, such connection may also assist with maintaining the structural integrity of the ultracapacitor module.

Figure 4:
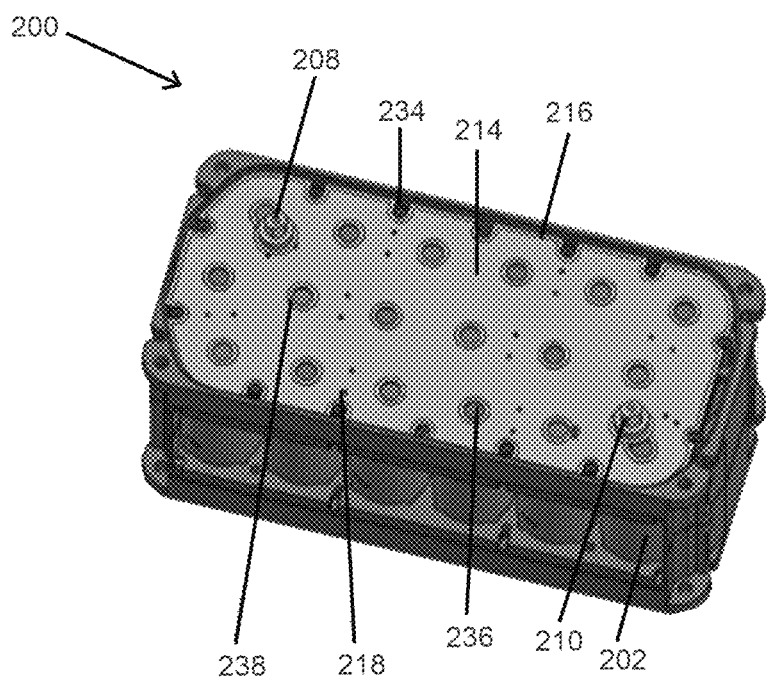
FIG. 4 illustrates a top view of an embodiment of an ultracapacitor module showing a first cover layer on the ultracapacitors.

When the enclosure members are interlocked to enclose the plurality of ultracapacitors, the enclosure members may only partially enclose the ultracapacitors. For instance, as illustrated in FIG. 2, the ultracapacitor module includes a top surface 160, a bottom surface 168, two side surfaces 162, and two side surfaces 164. In this regard, the top and bottom enclosure members may assist with enclosing at least two side surfaces, such as side surfaces 162, of the ultracapacitor module. In one embodiment, the enclosure members may assist with enclosing all four side surfaces 162, 164 of the ultracapacitor module. However, in one embodiment, at least the top surface 160 and/or bottom surface 168 of the ultracapacitor module and top and/or bottom of the ultracapacitors, respectively, may be exposed, if simply the enclosure members were present. Accordingly, a first cover layer 214 may be presented on a top surface 160 to cover the top surface of the ultracapacitors 202 as illustrated in FIG. 4. Such cover layer may be fastened into place using one or more fasteners 234. For example, the fasteners 234 may be utilized to connect the cover layer 214 to the respective enclosure member. Such cover layer 214 may also be adhered to the respective enclosure member using an adhesive 216. For instance, the adhesive may be provided along at least a portion, such as the entire, perimeter of the cover layer. Without intending to be limited by theory, such adhesive may assist with the dampening of vibration and may also assist with deterring any contaminants from entering into the compartment of the module. In addition, the cover layer 214 may be connected to the respective interconnect and/or pedestal by using rivets, screws, or other fasteners through holes 218. Without intending to be limited by theory, such combination of mechanisms/securements may assist in maintaining the structural integrity of the ultracapacitor module.

As illustrated in FIG. 4, the first cover layer 214 may include holes 236 which expose the terminals 232 of the ultracapacitors. An adhesive 238 may also be provided at such contact point between the cover layer and the terminal. Without intending to be limited by theory, such adhesive may assist with dampening vibration, which thereby may further improve the stability and structural integrity of the ultracapacitor module In general, the first cover layer 214 may be an insulating board or an electronic board, such as a circuit board. For example, the circuit board may be a balancing circuit as generally known in the art. In general, the balancing circuit may be an active balancing circuit or a passive balancing circuit. For example, an active balancing circuit may include active components, such as a regulator. In general, a regulator can be any device that is operable to compare the input voltage with the reference voltage and provide an output. In some embodiments, the regulator can include a comparator and/or one or more switching elements provided in a single package (e.g., integrated circuit). Meanwhile, a passive balancing circuit may include passive components, such as a resistor.

The first cover layer 214 may also include an aperture dimensioned to complement the external terminations 208, 210 of the ultracapacitors. For instance, in order to make an electrical connection for an end-use application, the external terminations may extend through the first cover layer 214. Although means of securing the first cover layer have been mentioned above, it should be understood that the first cover layer may also be secured using a fastener, such as a nut around the external termination.

While the first cover layer 214 is illustrated in FIG. 4 on a top surface of the ultracapacitor module such that it covers the top of the ultracapacitors, it should be understood that a first cover layer may also be provided on a bottom and opposing surface of the ultracapacitor module such that it covers the bottom of the ultracapacitors.

Figure 5:
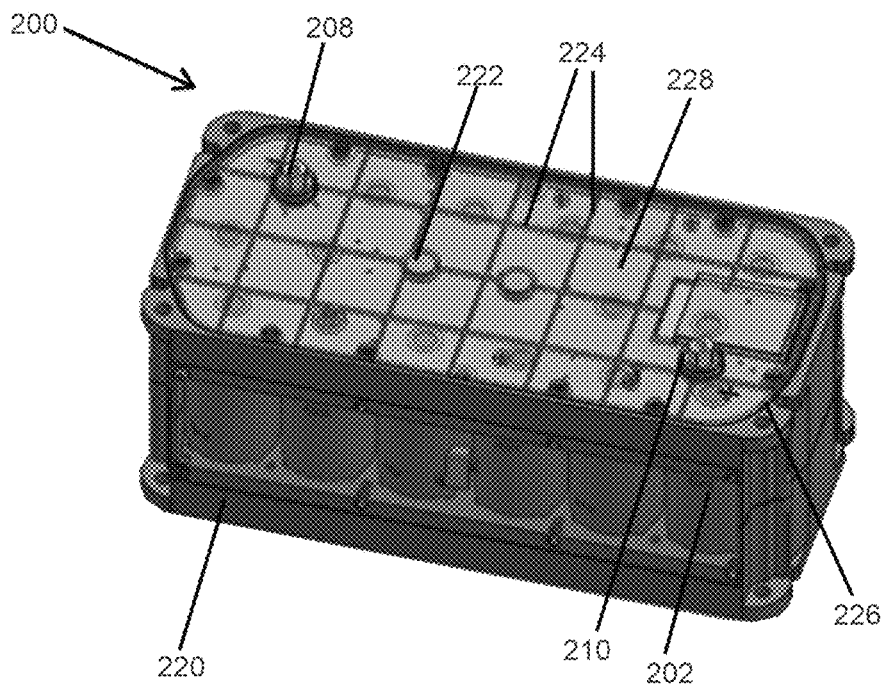
FIG. 5 illustrates a top view of an embodiment of an ultracapacitor module showing a second cover layer on the ultracapacitors.

Next, a second cover layer 228 may be provided on the first cover layer 214 as illustrated in FIG. 5. Such second cover layer may be presented to provide additional protection to the ultracapacitor module. As an example, the second cover layer 228 may include strengthening members 224 (e.g., strengthening ribs). Without intending to be limited by theory, such strengthening members may assist with dampening vibration. While FIG. 5 illustrates a second cover layer 228 on the first cover layer 214 on the top surface of the ultracapacitor module, it should be understood that second cover layer may also be provided on the first cover layer on the bottom and opposing surface of the ultracapacitor module.

In order to provide additional dampening, a cushioning member 222 may also be provided between the ultracapacitors and the second cover layer 228. For example, such cushioning member may be positioned on an ultracapacitor terminal in one embodiment as illustrated in FIG. 5. Alternatively, such cushioning member may be positioned on the surface of the first cover layer. Regardless, such cushioning member is provided to contact at least the second cover layer and provide a dampening effect. Such cushioning member may be any material that can provide a dampening effect. For example, such cushioning member may be made from a rubber or rubber-like material as mentioned herein. Furthermore, the shape and quantity of cushioning members is not limited by the present invention.

The second cover layer 228 may be secured using means known in the art. For instance, the second cover layer may include a recessed lid with an interlocking mechanism 226. For example, the interlocking mechanism may be a tongue and groove mechanism. In particular, the second cover layer may sit inside a groove provided within the respective enclosure member. In addition, the second cover layer 228 may also be secured to the first cover layer and/or enclosure member using one or more fasteners, such as rivets, screws, and the like. Without intending to be limited by theory, such interlocking mechanism may assist with sealing the ultracapacitor module and deterring any contaminants from entering into the compartment of the module.

The second cover layer 228 may also include an aperture dimensioned to complement the external terminations 208, 210 of the ultracapacitors. For instance, in order to make an electrical connection for an end-use application, the external terminations may extend through the second cover layer 228. Although means of securing the second cover layer have been mentioned above, it should be understood that the second cover layer may also be secured using a fastener, such as a nut around the external termination.

When the enclosure members are interlocked to enclose the plurality of ultracapacitors, the enclosure members may only partially enclose the ultracapacitors as indicated above. For instance, as illustrated in FIG. 2, the ultracapacitor module includes a top surface 160, a bottom surface 168, two side surfaces 162, and two side surfaces 164. In this regard, the top and bottom enclosure members may assist with enclosing at least two side surfaces, such as side surfaces 162, of the ultracapacitor module. In one embodiment, the enclosure members may assist with enclosing all four side surfaces 162, 164 of the ultracapacitor module. However, in one embodiment, at least the two side surfaces 164, such as the longer of the two side surfaces of the ultracapacitor module and side surfaces of the ultracapacitors may be exposed, if simply the enclosure members were present. Even with providing the first cover layer to cover the top surface and/or the bottom surface of the ultracapacitors and module, the side of the ultracapacitors may at least partially be exposed. In this regard, a side enclosure member 220 may be provided on each side in addition to the top and bottom enclosure members as illustrated in FIG. 5. The side enclosure member may be made from the same material as the top and bottom enclosure members as indicated herein. In one embodiment, the side enclosure members may be made from a metal, such as aluminum. Furthermore, the side enclosure members may be secured using means known in the art. For instance, the side enclosure members may be secured to the top and/or bottom enclosure members and/or the cover layers using fasteners, such as rivets, screws, and the like. Such side enclosure members 220 may also be adhered to the respective top and/or bottom enclosure members and/or cover layers using an adhesive. For instance, the adhesive may be provided along at least a portion, such as the entire, perimeter of the side enclosure members 220. Without intending to be limited by theory, side enclosure members may assist with heat energy dissipation. In this regard, to further assist with heat dissipation, such side enclosure members may have projections or elevations that provide an increased surface area to assist with heat dissipation. As one example utilized in the art, fins may be provided on the side enclosure members to assist with heat dissipation.

Figure 6:
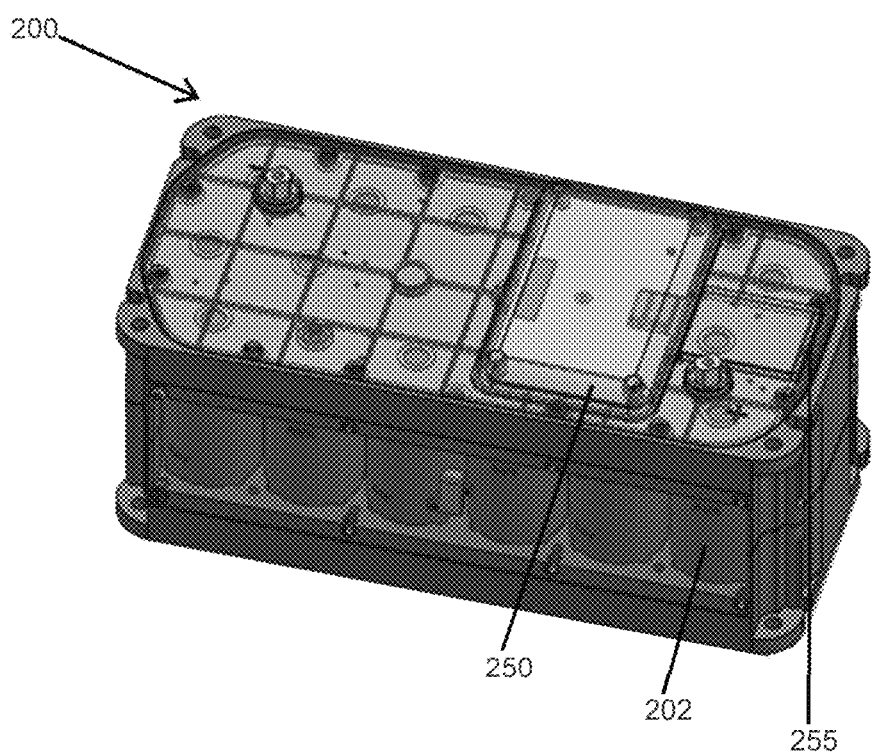
FIG. 6 illustrates a top view of an embodiment of an ultracapacitor module including a control board.

In one embodiment, the ultracapacitor module may also include a control board 250 as illustrated in FIG. 6. The control board may include electronic components to assist with the operation of the ultracapacitor module as well as an end-use application. The ultracapacitor module may also include a channel 255 for feeding wires or ribbons extending from the control board 250 to the respective ultracapacitors. In particular, such connection of wires or ribbons may be to the respective boards (e.g., first cover layers) that are electrically connected to the ultracapacitors. When provided, such wires or ribbons may be secured using an adhesive or a mechanical fastener, such as a clamp or a clip. Similarly, the control board 250 may be secured to the ultracapacitor module, in particular the second cover layer, using an adhesive or a fastener, such as a rivet, screw, or the like. Furthermore, an adhesive or sealant 258 may be provided between the control board 250 and the second cover layer 228. Such material 258 may further assist with preventing any contaminants from entering the ultracapacitor module.

Figure 7:
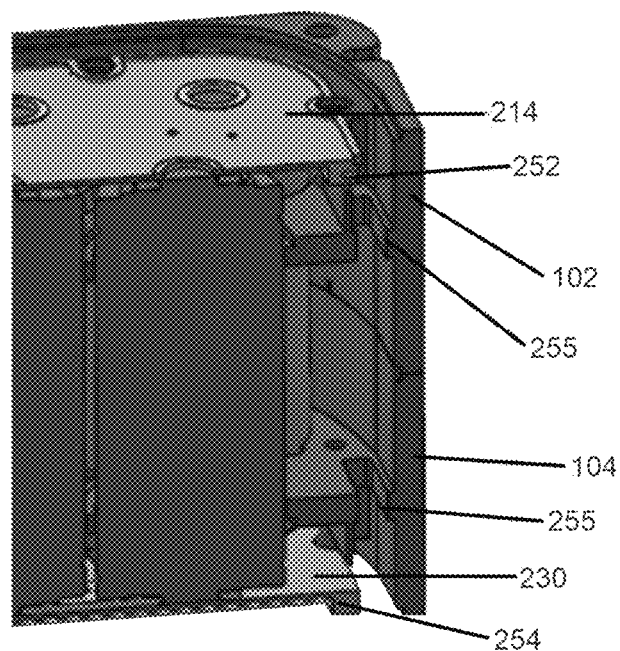
FIG. 7 illustrates a cut-out view of an embodiment of an ultracapacitor module.
Figure 8:
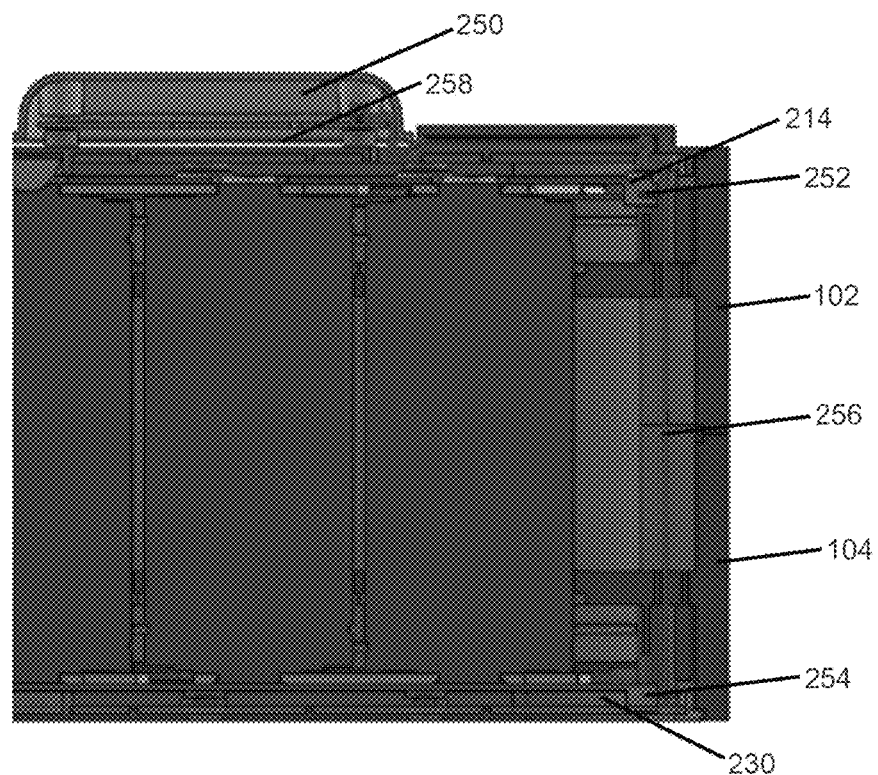
FIG. 8 illustrates another cut-out view of an embodiment of an ultracapacitor module.

Referring to FIGS. 7 and 8, cut-out perspective views of the ultracapacitor module are illustrated. As shown, the wiring channel 255 extends from the top of the module through a gap between the cover layers and ultracapacitors and the top and bottom enclosure members. As illustrated, such channel is present adjacent at least one side surface 162. As indicated, such channel 255 is utilized for feeding wires or ribbons 256 extending from the control board 250 to the respective ultracapacitors. In particular, such connection of wires or ribbons may be to the respective boards (e.g., first cover layers) that are electrically connected to the ultracapacitors. For example, such connection can be made through connectors 252, 254 on the respective cover layers 214, 230, in particular the edges of such cover layers.

Figure 13:
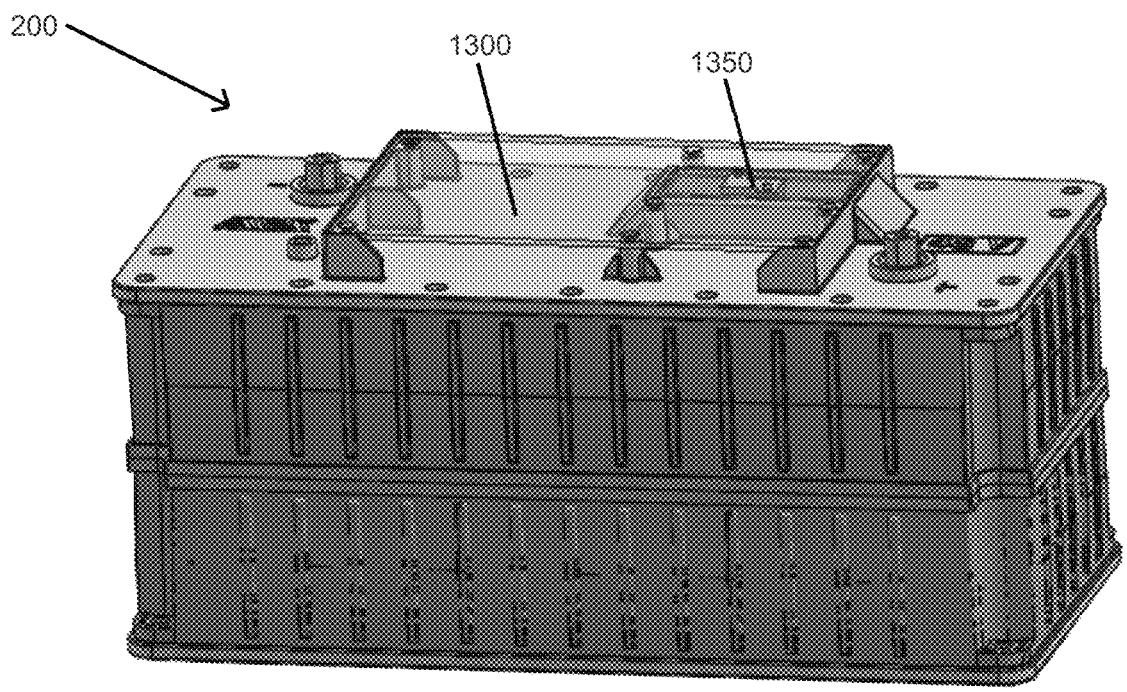
FIG. 13 illustrates an ultracapacitor module with a heat sink.

Also, a heat sink 1300 may be utilized with the module as disclosed herein and as illustrated in FIG. 13. Without intending to be limited by theory, the heat sink may be utilized to control the temperature and heat from the module and ultracapacitors stored therein. For instance, it may be utilized to allow for the transfer of heat or thermal energy generated by the ultracapacitors and/or the balancing circuit.

The heat sink may be formed from any metal known in the art that can allow for effective dissipation of heat. For instance, the metal may be any thermally conductive metal. Notably, the metal may have a thermal conductivity of about 50 W/m·K or more, such as about 100 W/m·K, such as about 150 W/m·K or more, such as about 200 W/m·K, such as about 250 W/m·K, such as about 300 W/m·K to about 600 W/m·K or less, such as about 500 W/m·K or less, such as about 450 W/m·K or less. The heat sink may be formed from silver, copper, gold, aluminum, molybdenum, zinc, lithium, tungsten, nickel, iron, palladium platinum, tin, an alloy thereof, or a combination thereof. Alloys include, but are not limited to, steel (e.g., stainless steel), brass, bronze, etc. Aluminum is particularly suitable for use in the present invention.

The heat sink may be integral with the module. For instance, the heat sink may be mounted into a side wall of the module. In another embodiment, the heat sink may be external as illustrated in FIG. 13. For instance, the heat sink may be attached or connected to the module. In such an embodiment, the heat sink may be attached or connected using means or fasteners as generally known in the art and disclosed herein for general fastening. Furthermore, the heat sink may be positioned so that it is offset from the housing of the module. For example, as illustrated in FIG. 13, such offset may allow for additional air contact by allowing air to flow below and above the heat sink, which can assist with a more effective heat transfer to the environment from the module and/or balancing circuit.

Furthermore, in one embodiment, the heat sink may have a generally planar surface as illustrated in FIG. 13. In another embodiment, the heat sink may have an increased surface area in comparison to simply a planar surface. For instance, the heat sink may have protrusions or fins. Such an increased surface may further assist with the removal and regulation of thermal energy from the balancing circuit and/or module.

Furthermore, as illustrated in FIG. 13, a heat dissipation component 1350 may be present. The heat dissipation component may be present on an external surface of the module, such as on an external surface of the control board. In addition, as the balancing circuit gains heat and it is transferred to the heat dissipation component, the heat from the heat dissipation component may then be transferred to the heat sink. For instance, the heat dissipation component may be provided such that it is in contact with the heat sink. In general, the heat sink has a larger surface area than the heat dissipation component. Such larger surface area can be more effective dissipating heat away from the balancing. In one embodiment, the surface area of the heat sink is at least 100%, such as at least 500%, such as at least 1,000% greater, such as at least 10,000% greater than the surface area of the heat dissipation component.

The manner in which the heat dissipation component is positioned is, however, not limited. For instance, it may be connected, mounted, attached, etc. to the heat sink containing a metal so long as the connection, mounting, attachment, etc. allows for the transfer of heat/thermal energy from the heat dissipation component. In one embodiment, the heat dissipation component may be positioned directly on the heat sink. In another embodiment, an intermediate material may be present between the heat dissipation component and the heat sink. In such embodiment, the intermediate material may be a thermally conductive metal as defined herein.

In general, the heat dissipation component may be an electronic component. In this regard, the electronic component may be any discrete device that is typically employed in electronic circuits. Notably, the heat dissipation component may be an active component, a passive component, or may include both an active component and a passive component.

In one embodiment, the heat dissipation component may be an active component. The active component may be a transistor. In particular, the transistor may be a field-effect transistor, such as a metal-oxide-semiconductor field-effect transistor. The dielectric material employed as the gate material in such transistors may be any employed in the art such as, but not limited to, polysilicon, silicon dioxide, etc. In another embodiment, the heat dissipation component may be a passive component. The passive component may be a resistor, such as a load resistor. In one particular embodiment, the heat dissipation component may include both an active component and a passive component. That is, the heat dissipation component may include a transistor and a resistor.

In general, the heat dissipation component is electrically connected to the balancing circuit. Any number of heat dissipation components may be employed according to the present invention. For instance, the module contains at least one heat dissipation component and in some embodiments at least two heat dissipation components. However, it should be understood that the module may contain more heat dissipation components.

Furthermore, as indicated above, an adhesive or rubber/rubber-like material may be utilized within certain parts of the ultracapacitor module. However, it should be understood that such materials may also include potting materials or cushioning materials instead of or in addition to such adhesive or rubber/rubber-like materials. Furthermore, these materials may be utilized in other areas of the module not expressly mentioned above. For example, these materials may be utilized at an interface where two components or surfaces are close to each other, in particular with possible relative motion under strong vibration. Without intending to be limited by theory, utilizing a material in such area may prevent fatigue and fretting of components due to bending from movement or friction from sliding contact. These materials may be utilized at an interface where two components or surfaces are close to each other and the structural strength/integrity of the module can be enhanced if such a material is utilized. Without intending to be limited by theory, utilizing a material in such area may increase the rigidity of the structure and/or decrease the change of fatigue due to bending. These materials may also be utilized to provide a sealed surface at an interface between two components. Without intending to be limited by theory, utilizing a material in such area may provide a seal to keep out contaminants, such as dust or liquids. In this regard, as mentioned above, certain locations have been specified for utilizing these materials. However, if not expressly mentioned, it should be understood that the present invention also includes other surfaces (or interfaces) upon which these materials may be utilized.

Ultracapacitor

As indicated herein, the present invention is directed to an ultracapacitor module including a plurality of ultracapacitors. The number of ultracapacitors utilized within the module are not necessarily limited by the present invention. For instance, the module may include at least two, such as at least 4, such as at least 6, such as at least 10, such as at least 14, such as at least 18 ultracapacitors.

Furthermore, the ultracapacitors utilized within the enclosure of the ultracapacitor module are not necessarily limited by the present invention. In general, the ultracapacitor includes a housing within which an electrode assembly and electrolyte are retained and sealed. The ultracapacitors also include terminals electrically connected to respective electrodes within the electrode assembly. For instance, in one embodiment, at least one external terminal may be provided on a top surface of the ultracapacitor while a second external terminal may be provided on a bottom surface of the ultracapacitor. In this regard, the external terminals extend from opposing ends of the electrode assembly and ultracapacitor. In another embodiment, both external terminals may be provided on the same surface, such as the top surface, of the ultracapacitor. In this regard, the external terminals may extend from the same side of the electrode assembly and ultracapacitor.

Electrode Assembly

In general, the ultracapacitor contains an electrode assembly including a first electrode, a second electrode, and a separator. For instance, the first electrode typically includes a first electrode containing a first carbonaceous coating (e.g., activated carbon particles) electrically coupled to a first current collector, and a second electrode typically includes a second carbonaceous coating (e.g., activated carbon particles) electrically coupled to a second current collector. A separator may also be positioned between the first electrode and the second electrode. In addition, the ultracapacitor contains first and second terminals that are electrically connected to first and second electrodes, respectively.

Various embodiments of such an assembly are described in more detail below.

Electrodes

As indicated above, the ultracapacitor includes an electrode assembly including a first electrode and a second electrode. The electrodes employed within the assembly generally contain a current collector. The current collectors may be formed from the same or different materials. For instance, in one embodiment, the current collectors of each electrode are formed from the same material. Regardless, each collector is typically formed from a substrate that includes a conductive metal, such as aluminum, stainless steel, nickel, silver, palladium, etc., as well as alloys thereof. Aluminum and aluminum alloys are particularly suitable for use in the present invention.

The current collector substrate may be in the form of a foil, sheet, plate, mesh, etc. The substrate may also have a relatively small thickness, such as about 200 micrometers or less, such as about 150 micrometers or less, such as about 100 micrometers or less, such as about 80 micrometers or less, such as about 50 micrometers or less, such as about 40 micrometers or less, such as about 30 micrometers or less. The substrate may have a thickness of about 1 micrometer or more, such as about 5 micrometers or more, such as about 10 micrometers or more, such as about 20 micrometers or more.

Figure 10:
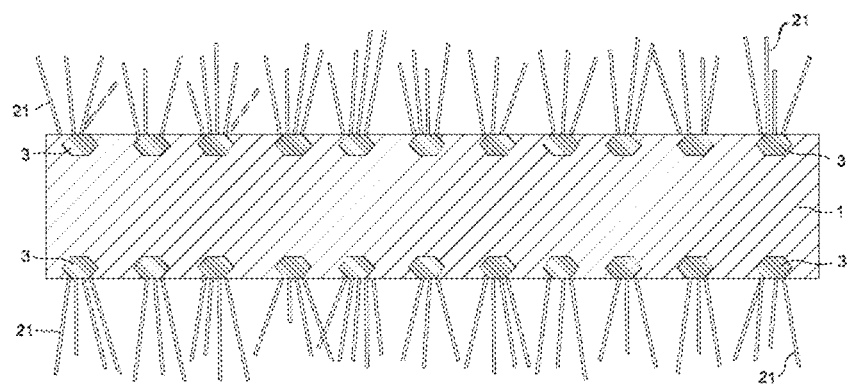
FIG. 10 illustrates an embodiment of a current collector that may be employed in the ultracapacitor.
Figure 11:
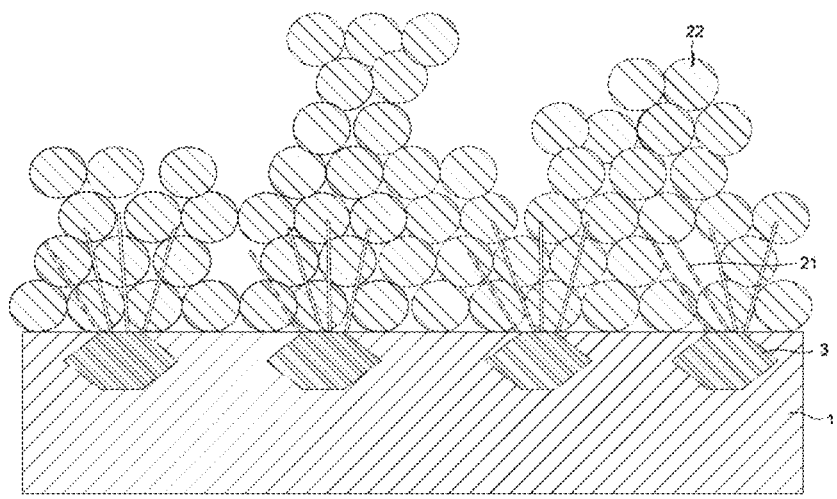
FIG. 11 illustrates an embodiment of a current collector/carbonaceous coating configuration that may be employed in the ultracapacitor.

Although by no means required, the surface of the substrate may be treated. For example, in one embodiment, the surface may be roughened, such as by washing, etching, blasting, etc. In certain embodiments, the current collector may contain a plurality of fiber-like whiskers that project outwardly from the substrate. Without intending to be limited by theory, it is believed that these whiskers can effectively increase the surface area of the current collector and also improve the adhesion of the current collector to the corresponding electrode. This can allow for the use of a relatively low binder content in the first electrode and/or second electrode, which can improve charge transfer and reduce interfacial resistance and consequently result in very low ESR values. The whiskers are typically formed from a material that contains carbon and/or a reaction product of carbon and the conductive metal. In one embodiment, for example, the material may contain a carbide of the conductive metal, such as aluminum carbide ($Al_4C_3$). Referring to FIG. 10, for instance, one embodiment of a current collector is shown that contains a plurality of whiskers 21 projecting outwardly from a substrate 1. If desired, the whiskers 21 may optionally project from a seed portion 3 that is embedded within the substrate 1. Similar to the whiskers 21, the seed portion 3 may also be formed from a material that contains carbon and/or a reaction product of carbon and the conductive metal, such as a carbide of the conductive metal (e.g., aluminum carbide). Further, FIG. 11 illustrates an electrode including the aforementioned current collector having a plurality of whiskers 21 projecting outwardly from a substrate 1 in combination with a carbonaceous coating 22 as described herein.

The manner in which such whiskers are formed on the substrate may vary as desired. In one embodiment, for instance, the conductive metal of the substrate is reacted with a hydrocarbon compound. Examples of such hydrocarbon compounds may include, for instance, paraffin hydrocarbon compounds, such as methane, ethane, propane, n-butane, isobutane, pentane, etc.; olefin hydrocarbon compounds, such as ethylene, propylene, butene, butadiene, etc.; acetylene hydrocarbon compounds, such as acetylene; as well as derivatives or combinations of any of the foregoing. It is generally desired that the hydrocarbon compounds are in a gaseous form during the reaction. Thus, it may be desired to employ hydrocarbon compounds, such as methane, ethane, and propane, which are in a gaseous form when heated. Although not necessarily required, the hydrocarbon compounds are typically employed in a range of from about 0.1 parts to about 50 parts by weight, and in some embodiments, from about 0.5 parts by weight to about 30 parts by weight, based on 100 parts by weight of the substrate. To initiate the reaction with the hydrocarbon and conductive metal, the substrate is generally heated in an atmosphere that is at a temperature of about 300° C. or more, in some embodiments about 400° C. or more, and in some embodiments, from about 500° C. to about 650° C. The time of heating depends on the exact temperature selected, but typically ranges from about 1 hour to about 100 hours. The atmosphere typically contains a relatively low amount of oxygen to minimize the formation of a dielectric film on the surface of the substrate. For example, the oxygen content of the atmosphere may be about 1% by volume or less.

The electrodes used in the ultracapacitor also contain carbonaceous materials that are coated onto opposing sides of the current collectors. While they may be formed from the same or different types of materials and may contain one or multiple layers, each of the carbonaceous coatings generally contains at least one layer that includes activated particles. In certain embodiments, for instance, the activated carbon layer may be directly positioned over the current collector and may optionally be the only layer of the carbonaceous coating. Examples of suitable activated carbon particles may include, for instance, coconut shell-based activated carbon, petroleum coke-based activated carbon, pitch-based activated carbon, polyvinylidene chloride-based activated carbon, phenolic resin-based activated carbon, polyacrylonitrile-based activated carbon, and activated carbon from natural sources such as coal, charcoal or other natural organic sources.

In certain embodiments, it may be desired to selectively control certain aspects of the activated carbon particles, such as their particle size distribution, surface area, and pore size distribution to help improve ion mobility for certain types of electrolytes after being subjected to one or more charge-discharge cycles. For example, at least 50% by volume of the particles (D50 size) may have a size in the range of from about 0.01 micrometers or more, such as about 0.1 micrometers or more, such as about 0.5 micrometers or more, such as about 1 micrometer or more to about 30 micrometers or less, such as about 25 micrometers or less, such as about 20 micrometers or less, such as about 15 micrometers or less, such as about 10 micrometers or less. At least 90% by volume of the particles (D90 size) may likewise have a size in the range of from about 2 micrometers or more, such as about 5 micrometers or more, such as about 6 micrometers or more to about 40 micrometers or less, such as about 30 micrometers or less, such as about 20 micrometers or less, such as about 15 micrometers or less. The BET surface may also range from about 900 $m^2/g$ or more, such as about 1,000 $m^2/g$ or more, such as about 1,100 $m^2/g$ or more, such as about 1,200 $m^2/g$ or more to about 3,000 $m^2/g$ or less, such as about 2,500 $m^2/g$ or less, such as about 2,000 $m^2/g$ or less, such as about 1,800 $m^2/g$ or less, such as about 1,500 $m^2/g$ or less.

In addition to having a certain size and surface area, the activated carbon particles may also contain pores having a certain size distribution. For example, the amount of pores less than about 2 nanometers in size (i.e., "micropores") may provide a pore volume of about 50 vol. % or less, such as about 40 vol. % or less, such as about 30 vol. % or less, such as about 20 vol. % or less, such as about 15 vol. % or less, such as about 10 vol. % or less, such as about 5 vol. % or less of the total pore volume. The amount of pores less than about 2 nanometers in size (i.e., "micropores") may provide a pore volume of about 0 vol % or more, such as about 0.1 vol % or more, such as about 0.5 vol % or more, such as 1 vol % or more of the total pore volume. The amount of pores between about 2 nanometers and about 50 nanometers in size (i.e., "mesopores") may likewise be about 20 vol. % or more, such as about 25 vol. % or more, such as about 30 vol. % or more, such as about 35 vol. % or more, such as about 40 vol. % or more, such as about 50 vol. % or more of the total pore volume. The amount of pores between about 2 nanometers and about 50 nanometers in size (i.e., "mesopores") may be about 90 vol. % or less, such as about 80 vol. % or less, such as about 75 vol. % or less, such as about 65 vol. % or less, such as about 55 vol. % or less, such as about 50 vol. % or less of the total pore volume. Finally, the amount of pores greater than about 50 nanometers in size (i.e., "macropores") may be about 1 vol. % or more, such as about 5 vol. % or more, such as about 10 vol. % or more, such as about 15 vol. % or more of the total pore volume. The amount of pores greater than about 50 nanometers in size (i.e., "macropores") may be about 50 vol. % or less, such as about 40 vol. % or less, such as about 35 vol. % or less, such as about 30 vol. % or less, such as about 25 vol. % or less of the total pore volume. The total pore volume of the carbon particles may be in the range of from about 0.2 $cm^3/g$ or more, such as about 0.4 $cm^3/g$ or more, such as about, 0.5 $cm^3/g$ or more to about 1.5 $cm^3/g$ or less, such as about 1.3 $cm^3/g$ or less, such as about 1.0 $cm^3/g$ or less, such as about 0.8 $cm^3/g$ or less. The median pore width may be about 8 nanometers or less, such as about 5 nanometers or less, such as about 4 nanometers or less. The median pore width may be about 1 nanometer or more, such as about 2 nanometers or more. The pore sizes and total pore volume may be measured using nitrogen adsorption and analyzed by the Barrett-Joyner-Halenda ("BJH") technique as is well known in the art.

One unique aspect of the present invention is that the electrodes need not contain a substantial amount of binders conventionally employed in ultracapacitor electrodes. That is, binders may be present in an amount of about 60 parts or less, such as about 40 parts or less, such as about 30 parts or less, such as about 25 parts or less, such as about 20 parts or less to about 1 part or more, such as about 5 parts or more per 100 parts of carbon in the carbonaceous coating. Binders may, for example, constitute about 15 wt. % or less, such as about 10 wt. % or less, such as about 8 wt. % or less, such as about 5 wt. % or less, such as about 4 wt. % or less of the total weight of the carbonaceous coating. The binders may constitute about 0.1 wt. % or more, such as about 0.5 wt. % or more, such as about 1 wt. % or more of the total weight of the carbonaceous coating.

Nevertheless, when employed, any of a variety of suitable binders can be used in the electrodes. For instance, water-insoluble organic binders may be employed in certain embodiments, such as styrene-butadiene copolymers, polyvinyl acetate homopolymers, vinyl-acetate ethylene copolymers, vinyl-acetate acrylic copolymers, ethylene-vinyl chloride copolymers, ethylene-vinyl chloride-vinyl acetate terpolymers, acrylic polyvinyl chloride polymers, acrylic polymers, nitrile polymers, fluoropolymers such as polytetrafluoroethylene or polyvinylidene fluoride, polyolefins, etc., as well as mixtures thereof. Water-soluble organic binders may also be employed, such as polysaccharides and derivatives thereof. In one particular embodiment, the polysaccharide may be a nonionic cellulosic ether, such as alkyl cellulose ethers (e.g., methyl cellulose and ethyl cellulose); hydroxyalkyl cellulose ethers (e.g., hydroxyethyl cellulose, hydroxypropyl cellulose, hydroxypropyl hydroxybutyl cellulose, hydroxyethyl hydroxypropyl cellulose, hydroxyethyl hydroxybutyl cellulose, hydroxyethyl hydroxypropyl hydroxybutyl cellulose, etc.); alkyl hydroxyalkyl cellulose ethers (e.g., methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose); carboxyalkyl cellulose ethers (e.g., carboxymethyl cellulose); and so forth, as well as protonated salts of any of the foregoing, such as sodium carboxymethyl cellulose.

If desired, other materials may also be employed within an activated carbon layer of the carbonaceous materials. For example, in certain embodiments, a conductivity promoter may be employed to further increase electrical conductivity. Exemplary conductivity promoters may include, for instance, carbon black, graphite (natural or artificial), graphite, carbon nanotubes, nanowires or nanotubes, metal fibers, graphenes, etc., as well as mixtures thereof. Carbon black is particularly suitable in one embodiment. In another embodiment, carbon nanotubes are particularly suitable. When employed, conductivity promoters typically constitute about 60 parts or less, such as about 40 parts or less, such as about 30 parts or less, such as about 25 parts or less, such as about 20 parts or less to about 1 part or more, such as about 5 parts or more per 100 parts of carbon in the carbonaceous coating. Conductivity promoters may, for example, constitute about 15 wt. % or less, such as about 10 wt. % or less, such as about 8 wt. % or less, such as about 5 wt. % or less, such as about 4 wt. % or less of the total weight of the carbonaceous coating. The conductivity promoters may constitute about 0.1 wt. % or more, such as about 0.5 wt. % or more, such as about 1 wt. % or more of the total weight of the carbonaceous coating. Meanwhile, activated carbon particles likewise typically constitute 85 wt. % or more, such as about 90 wt. % or more, such as about 95 wt. % or more, such as about 97 wt. % or more of the total weight of the carbonaceous coating. The activated carbon particles may constitute less than 100 wt. %, such as about 99.5 wt. % or less, such as about 99 wt. % or less, such as about 98 wt. % or less of the total weight of the carbonaceous coating.

The particular manner in which a carbonaceous material is coated onto to the sides of a current collector may vary as is well known to those skilled in the art, such as printing (e.g., rotogravure), spraying, slot-die coating, drop-coating, dip-coating, etc. Regardless of the manner in which it is applied, the resulting electrode is typically dried to remove moisture from the coating, such as at a temperature of about 100° C. or more, in some embodiments about 200° C. or more, and in some embodiments, from about 300° C. to about 500° C. The electrode may also be compressed (e.g., calendared) to optimize the volumetric efficiency of the ultracapacitor. After any optional compression, the thickness of each carbonaceous coating may generally vary based on the desired electrical performance and operating range of the ultracapacitor. Typically, however, the thickness of a coating is from about 20 to about 200 micrometers, 30 to about 150 micrometers, and in some embodiments, from about 40 to about 100 micrometers. Coatings may be present on one or both sides of a current collector. Regardless, the thickness of the overall electrode (including the current collector and the carbonaceous coating(s) after optional compression) is typically within a range of from about 20 to about 350 micrometers, in some embodiments from about 30 to about 300 micrometers, and in some embodiments, from about 50 to about 250 micrometers.

Separator

As indicated above, the electrode assembly may include a separator positioned between the first electrode and the second electrode. The separator can enable electrical isolation of one electrode from another to help prevent an electrical short but still allow transport of ions between the two electrodes. In certain embodiments, for example, a separator may be employed that includes a cellulosic fibrous material (e.g., airlaid paper web, wet-laid paper web, etc.), nonwoven fibrous material (e.g., polyolefin nonwoven webs), woven fabrics, film (e.g., polyolefin film), etc. Cellulosic fibrous materials are particularly suitable for use in the ultracapacitor, such as those containing natural fibers, synthetic fibers, etc. Specific examples of suitable cellulosic fibers for use in the separator may include, for instance, hardwood pulp fibers, softwood pulp fibers, rayon fibers, regenerated cellulosic fibers, etc.

Regardless of the particular materials employed, the separator typically has a thickness of about 150 micrometers or less, such as about 100 micrometers or less, such as about 80 micrometers or less, such as about 50 micrometers or less, such as about 40 micrometers or less, such as about 30 micrometers or less. The separator may have a thickness of about 1 micrometer or more, such as about 5 micrometers or more, such as about 10 micrometers or more, such as about 20 micrometers or more.

Nonaqueous Electrolyte

In addition, the ultracapacitor may also include an electrolyte employed within the housing. The electrolyte is generally nonaqueous in nature and thus contains at least one nonaqueous solvent. To help extend the operating temperature range of the ultracapacitor, it is typically desired that the nonaqueous solvent have a relatively high boiling temperature, such as about 150° C. or more, in some embodiments about 200° C. or more, and in some embodiments, from about 220° C. to about 300° C. Particularly suitable high boiling point solvents may include, for instance, cyclic carbonate solvents, such as ethylene carbonate, propylene carbonate, butylene carbonate, vinylene carbonate, etc. Propylene carbonate is particularly suitable due to its high electric conductivity and decomposition voltage, as well as its ability to be used over a wide range of temperatures. Of course, other nonaqueous solvents may also be employed, either alone or in combination with a cyclic carbonate solvent. Examples of such solvents may include, for instance, open-chain carbonates (e.g., dimethyl carbonate, ethyl methyl carbonate, diethyl carbonate, etc.), aliphatic monocarboxylates (e.g., methyl acetate, methyl propionate, etc.), lactone solvents (e.g., butyrolactone valerolactone, etc.), nitriles (e.g., acetonitrile, glutaronitrile, adiponitrile, methoxyacetonitrile, 3-methoxypropionitrile, etc.), amides (e.g., N,N-dimethylformam ide, N,N-diethylacetamide, N-methylpyrrolidinone), alkanes (e.g., nitromethane, nitroethane, etc.), sulfur compounds (e.g., sulfolane, dimethyl sulfoxide, etc.); and so forth.

The electrolyte also contains at least one ionic liquid, which may be dissolved in the nonaqueous solvent. While the concentration of the ionic liquid can vary, it is typically desired that the ionic liquid is present at a relatively high concentration. For example, the ionic liquid may be present in an amount of about 0.8 moles per liter (M) of the electrolyte or more, in some embodiments about 1.0 M or more, such as about 1.2 M or more, such as about 1.3 M or more, such as about 1.5 M or more. The ionic liquid may be present in an amount of about 2.0 M or less, such as about 1.8 M or less, such as about 1.5 M or less, such as about 1.4 M or less, such as about 1.3 M or less.

The ionic liquid is generally a salt having a relatively low melting temperature, such as about 400° C. or less, in some embodiments about 350° C. or less, in some embodiments from about 1° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, unsubstituted or substituted organoquaternary ammonium compounds, such as ammonium (e.g., trimethylammonium, tetraethylammonium, etc.), pyridinium, pyridazinium, pyramidinium, pyrazinium, imidazolium, pyrazolium, oxazolium, triazolium, thiazolium, quinolinium, piperidinium, pyrrolidinium, quaternary ammonium Spiro compounds in which two or more rings are connected together by a spiro atom (e.g., carbon, heteroatom, etc.), quaternary ammonium fused ring structures (e.g., quinolinium, isoquinolinium, etc.), and so forth. In one particular embodiment, for example, the cationic species may be an N-spirobicyclic compound, such as symmetrical or asymmetrical N-spirobicyclic compounds having cyclic rings. One example of such a compound has the following structure:

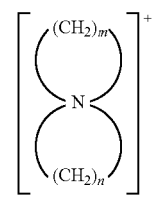

wherein m and n are independently a number from 3 to 7, and in some embodiments, from 4 to 5 (e.g., pyrrolidinium or piperidinium).

Suitable counterions for the cationic species may likewise include halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis(pentafluoroethyl-sulfonyl)imide, bis(trifluoromethylsulfonyl)imide, bis(trifluoromethyl)imide, etc.); borates (e.g., tetrafluoroborate, tetracyanoborate, bis[oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); alum inates (e.g., tetrachloroaluminate); fatty acid carboxylates (e.g., oleate, isostearate, pentadecafluorooctanoate, etc.); cyanates; acetates; and so forth, as well as combinations of any of the foregoing.

Several examples of suitable ionic liquids may include, for instance, spiro-(1,1')-bipyrrolidinium tetrafluoroborate, triethylmethyl ammonium tetrafluoroborate, tetraethyl ammonium tetrafluoroborate, spiro-(1,1')-bipyrrolidinium iodide, triethylmethyl ammonium iodide, tetraethyl ammonium iodide, methyltriethylammonium tetrafluoroborate, tetrabutylammonium tetrafluoroborate, tetraethylammonium hexafluorophosphate, etc.

Housing

Figure 12:
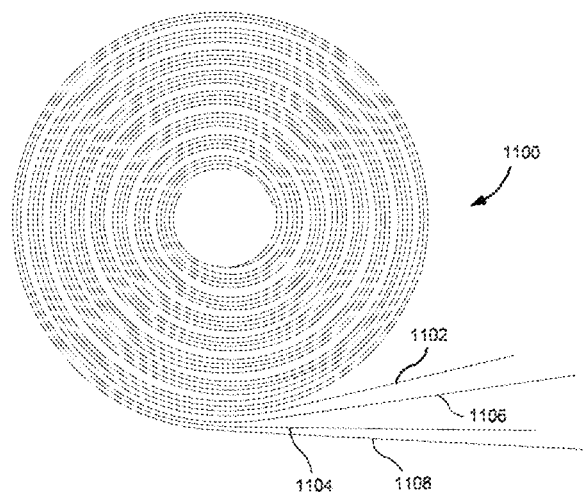
FIG. 12 illustrates an embodiment for forming an electrode assembly that can be used in the ultracapacitor.

The ultracapacitor of the present invention employs a housing within which the electrode assembly and electrolyte are retained. The manner in which the components are inserted into the housing may vary as is known in the art. For example, the electrodes and separator may be initially folded, wound, or otherwise contacted together to form an electrode assembly. The electrolyte may optionally be immersed into the electrodes of the assembly. In one particular embodiment, the electrodes, separator, and optional electrolyte may be wound into an electrode assembly having a "jelly-roll" configuration. Referring to FIG. 12, for instance, one embodiment of such a jellyroll electrode assembly 1100 is shown that contains a first electrode 1102, a second electrode 1104, and a separator 1106 positioned between the electrodes 1102 and 1104. In this particular embodiment, the electrode assembly 1100 also includes another separator 1108 that is positioned over the second electrode 1104. In this manner, each of two coated surfaces of the electrodes is separated by a separator, thereby maximizing surface area per unit volume and capacitance. While by no means required, the electrodes 1102 and 1104 are offset in this embodiment so as to leave their respective contact edges extending beyond first and second edges of the first and second separators 1106 and 1108, respectively. Among other things, this can help prevent "shorting" due to the flow of electrical current between the electrodes. However, it should be understood that other configurations may also be utilized. For instance, in another embodiment, the electrodes, separator, and optional electrolyte may be provided as an electrode assembly having a laminar configuration.

As indicated herein, the components may be provided within the housing of the ultracapacitor and optionally hermetically sealed. The nature of the housing may vary as desired. In certain embodiments, for example, the housing may contain a container that encloses the components of the ultracapacitor. For example, the housing may contain a metal container ("can"), such as those formed from tantalum, niobium, aluminum, nickel, hafnium, titanium, copper, silver, steel (e.g., stainless), alloys thereof, composites thereof (e.g., metal coated with electrically conductive oxide), and so forth. Aluminum is particularly suitable for use in the present invention. The metal container may have any of a variety of different shapes, such as cylindrical, D-shaped, etc. Cylindrically-shaped containers are particular suitable.

Figure 9:
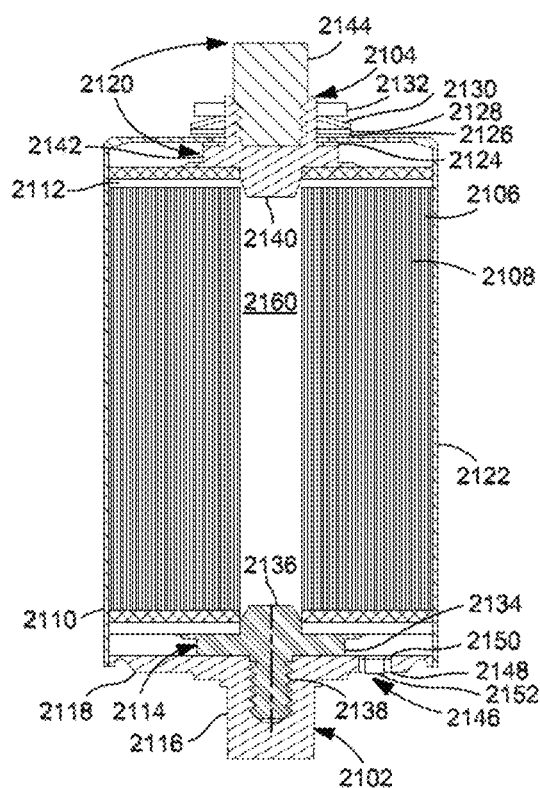
FIG. 9 illustrates an embodiment of the housing of the ultracapacitor.

The electrode assembly may be sealed within the cylindrical housing using a variety of different techniques. Referring to FIG. 9, one embodiment of an ultracapacitor is shown that contains an electrode assembly 2108, which contains layers 2106 wound together in a jellyroll configuration as discussed above. In this particular embodiment, the ultracapacitor contains a first collector disc 2114, which contains a disc-shaped portion 2134, a stud portion 2136, and a fastener 2138 (e.g., screw). The collector disc 2114 is aligned with a first end of a hollow core 2160, which is formed in the center of the electrode assembly, and the stud portion 2136 is then inserted into an opening of the core so that the disc-shaped portion 2134 sits against the first end of the electrode assembly 2108 at a first contact edge 2110. A lid 2118 is welded (e.g., laser welded) to a first terminal post 2116, and a socket, which may be for example, threaded, is coupled to the fastener 2138. The ultracapacitor also contains a second collector disc 2120, which contains a disc-shaped portion 2142, a stud portion 2140, and a second terminal post 2144. The second collector disc 2120 is aligned with the second end of the hollow core 2160, and the stud portion 2140 is then inserted into the opening of the core so that the collector disc portion 2142 sits against the second end of the electrode assembly 2108.

A metal container 2122 (e.g., cylindrically-shaped can) is thereafter slid over the electrode assembly 2108 so that the second collector disc 2120 enters the container 2122 first, passes through a first insulating washer 2124, passes through an axial hole at an end of the container 2122, and then passes through a second insulating washer 2126. The second collector disc 2120 also passes through a flat washer 2128 and a spring washer 2130. A locknut 2132 is tightened over the spring washer 2130, which compresses the spring washer 2130 against the flat washer 2128, which in turn is compressed against the second insulating washer 2126. The second insulating washer 2126 is compressed against the exterior periphery of the axial hole in the metal container 2122, and as the second collector disc 2120 is drawn by this compressive force toward the axial hole, the first insulating washer 2124 is compressed between the second collector disc 2120 and an interior periphery of the axial hole in the container 2122. A flange on the first insulating washer 2124 inhibits electrical contact between the second collector disc 2120 and a rim of the axial hole. Simultaneously, the lid 2118 is drawn into an opening of the container 2122 so that a rim of the lid 2118 sits just inside a lip of the opening of the container 2122. The rim of the lid 2118 is then welded to the lip of the opening of the container 2122.

Once the locknut 2132 is tightened against the spring washer 2130, a hermetic seal may be formed between the axial hole, the first insulating washer 2124, the second insulating washer 2126, and the second collector disc 2120. Similarly, the welding of the lid 2118 to the lip of the container 2122, and the welding of the lid 2118 to the first terminal post 2116, may form another hermetic seal. A hole 2146 in the lid 2118 can remain open to serve as a fill port for the electrolyte described above. Once the electrolyte is in the can (i.e., drawn into the can under vacuum, as described above), a bushing 2148 is inserted into the hole 2146 and seated against a flange 2150 at an interior edge of the hole 2146. The bushing 2148 may, for instance, be a hollow cylinder in shape, fashioned to receive a plug 2152. The plug 2152, which is cylindrical in shape, is pressed into a center of the bushing 2148, thereby compressing the bushing 2148 against an interior of the hole 2146 and forming a hermetic seal between the hole 2146, the bushing 2148, and the plug 2152. The plug 2152 and the bushing 2148 may be selected to dislodge when a prescribed level of pressure is reached within the ultracapacitor, thereby forming an overpressure safety mechanism.

The embodiments described above generally refer to the use of a single electrode assembly in the ultracapacitor. It should of course be understood, however, that the capacitor of the present invention may also contain two or more electrode assemblies. For instance, in one such embodiment, for example, the ultracapacitor may include a stack of two or more electrode assemblies, which may be the same or different.

Properties and Applications

The ultracapacitor utilized according to the present invention may exhibit excellent electrical properties, in particular when exposed to high temperatures. For example, the ultracapacitor may exhibit a capacitance of about 6 Farads per cubic centimeter ("F/cm$^3$") or more, in some embodiments about 8 F/cm$^3$ or more, in some embodiments from about 9 to about 100 F/cm$^3$, and in some embodiments, from about 10 to about 80 F/cm$^3$, measured at a temperature of 23° C., frequency of 120 Hz, and without an applied voltage. The ultracapacitor may also have a low equivalence series resistance ("ESR"), such as about 150 mohms or less, in some embodiments less than about 125 mohms, in some embodiments from about 0.01 to about 100 mohms, and in some embodiments, from about 0.05 to about 70 mohms, determined at a temperature of 23° C., frequency of 1 kHz, and without an applied voltage. As indicated above, the resulting ultracapacitor may exhibit a wide variety of beneficial electrical properties, such as improved capacitance and ESR values. Notably, the ultracapacitor may exhibit excellent electrical properties even when exposed to high temperatures. For example, the ultracapacitor may be placed into contact with an atmosphere having a temperature of from about 80° C. or more, in some embodiments from about 100° C. to about 150° C., and in some embodiments, from about 105° C. to about 130° C. (e.g., 85° C. or 105° C.). The capacitance and ESR values can remain stable at such temperatures for a substantial period of time, such as for about 100 hours or more, in some embodiments from about 300 hours to about 5000 hours, and in some embodiments, from about 600 hours to about 4500 hours (e.g., 168, 336, 504, 672, 840, 1008, 1512, 2040, 3024, or 4032 hours).

In one embodiment, for example, the ratio of the capacitance value of the ultracapacitor after being exposed to the hot atmosphere (e.g., 85° C. or 105° C.) for 1008 hours to the capacitance value of the ultracapacitor when initially exposed to the hot atmosphere is about 0.75 or more, in some embodiments from about 0.8 to 1.0, and in some embodiments, from about 0.85 to 1.0. Such high capacitance values can also be maintained under various extreme conditions, such as when applied with a voltage and/or in a humid atmosphere. For example, the ratio of the capacitance value of the ultracapacitor after being exposed to the hot atmosphere (e.g., 85° C. or 105° C.) and an applied voltage to the initial capacitance value of the ultracapacitor when exposed to the hot atmosphere but prior to being applied with the voltage may be about 0.60 or more, in some embodiments from about 0.65 to 1.0, and in some embodiments, from about 0.7 to 1.0. The voltage may, for instance, be about 1 volt or more, in some embodiments about 1.5 volts or more, and in some embodiments, from about 2 to about 10 volts (e.g., 2.1 volts). In one embodiment, for example, the ratio noted above may be maintained for 1008 hours or more. The ultracapacitor may also maintain the capacitance values noted above when exposed to high humidity levels, such as when placed into contact with an atmosphere having a relative humidity of about 40% or more, in some embodiments about 45% or more, in some embodiments about 50% or more, and in some embodiments, about 70% or more (e.g., about 85% to 100%). Relative humidity may, for instance, be determined in accordance with ASTM E337-02, Method A (2007). For example, the ratio of the capacitance value of the ultracapacitor after being exposed to the hot atmosphere (e.g., 85° C. or 105° C.) and high humidity (e.g., 85%) to the initial capacitance value of the ultracapacitor when exposed to the hot atmosphere but prior to being exposed to the high humidity may be about 0.7 or more, in some embodiments from about 0.75 to 1.0, and in some embodiments, from about 0.80 to 1.0. In one embodiment, for example, this ratio may be maintained for 1008 hours or more.

The ESR can also remain stable at such temperatures for a substantial period of time, such as noted above. In one embodiment, for example, the ratio of the ESR of the ultracapacitor after being exposed to the hot atmosphere (e.g., 85° C. or 105° C.) for 1008 hours to the ESR of the ultracapacitor when initially exposed to the hot atmosphere is about 1.5 or less, in some embodiments about 1.2 or less, and in some embodiments, from about 0.2 to about 1. Notably, such low ESR values can also be maintained under various extreme conditions, such as when applied with a high voltage and/or in a humid atmosphere as described above. For example, the ratio of the ESR of the ultracapacitor after being exposed to the hot atmosphere (e.g., 85° C. or 105° C.) and an applied voltage to the initial ESR of the ultracapacitor when exposed to the hot atmosphere but prior to being applied with the voltage may be about 1.8 or less, in some embodiments about 1.7 or less, and in some embodiments, from about 0.2 to about 1.6. In one embodiment, for example, the ratio noted above may be maintained for 1008 hours or more. The ultracapacitor may also maintain the ESR values noted above when exposed to high humidity levels. For example, the ratio of the ESR of the ultracapacitor after being exposed to the hot atmosphere (e.g., 85° C. or 105° C.) and high humidity (e.g., 85%) to the initial capacitance value of the ultracapacitor when exposed to the hot atmosphere but prior to being exposed to the high humidity may be about 1.5 or less, in some embodiments about 1.4 or less, and in some embodiments, from about 0.2 to about 1.2. In one embodiment, for example, this ratio may be maintained for 1008 hours or more.

Ultracapacitors and modules containing them can be employed to store large amounts of electrical charge. The ultracapacitor module can be utilized as a primary power source or a secondary power source. As a result, the ultracapacitor modules of the present disclosure can be employed in a variety of applications. For instance, they can be used in a variety of energy applications including, but not limited to, wind turbines, solar turbines, solar panels, fuel cells, uninterruptible power supplies. In addition, they can also be used in a variety of transportation vehicles. For instance, these may include, but are not limited, to general transportation applications (e.g., battery propelled electric vehicles, hybrid electric vehicles including buses, engine starts, power and braking recuperation systems, etc.), trains and trams (e.g., maglev trains, track switching, starter systems, etc.), and aerospace (e.g., actuators for doors, evacuation slides, etc.). They also have a variety of industrial applications including automation (e.g., robotics, etc.), vehicles (e.g., fork lifts, cranes, electric carts, etc.). The modules and ultracapacitors may also have a variety of applications for the military such as for military vehicles. These applications may also include motor startups for tanks and submarines, phased array radar antennae, laser power supplies, radio communications, avionics display and instrumentation, GPS guidance, etc.

Test Methods

Equivalent Series Resistance (ESR): Equivalence series resistance may be measured using a Keithley 3330 Precision LCZ meter with a DC bias of 0.0 volts, 1.1 volts, or 2.1 volts (0.5 volt peak to peak sinusoidal signal). The operating frequency is 1 kHz. A variety of temperature and relative humidity levels may be tested. For example, the temperature may be 23° C., 85° C. or 105° C., and the relative humidity may be 25% or 85%.

Capacitance: The capacitance may be measured using a Keithley 3330 Precision LCZ meter with a DC bias of 0.0 volts, 1.1 volts, or 2.1 volts (0.5 volt peak to peak sinusoidal signal). The operating frequency is 120 Hz. A variety of temperature and relative humidity levels may be tested. For example, the temperature may be 23° C., 85° C. or 105° C., and the relative humidity may be 25% or 85%.

Vibration Profile: The vibration is conducted in accordance with ISO 16750-3-2012, Table 12 and IEC 60068-2-64. The test is conducted for 32 hours, under a root mean square acceleration of 57.9 m/s$^2$, and the frequency and power spectral density values as indicated in Table 12 of such test and provided herein: 10 Hz-18 (m/s$^2$)$^2$/Hz; 20 Hz-36 (m/s$^2$)$^2$/Hz; 30 Hz-36 (m/s$^2$)$^2$/Hz; 180 Hz-1 (m/s$^2$)$^2$/Hz; 2000 Hz-1 (m/s$^2$)$^2$/Hz.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An ultracapacitor module comprising:
an enclosure including a top enclosure member and a bottom enclosure member connected to each other via at least one interlocking mechanism, and
a plurality of ultracapacitors housed within the enclosure wherein at least one ultracapacitor of the plurality of ultracapacitors is secured to the enclosure,
wherein at least one of the top enclosure member and the bottom enclosure member includes at least one individual opening through which the at least one ultracapacitor is provided,
wherein the top enclosure member and the bottom enclosure member partially enclose the plurality of ultracapacitors,
wherein the ultracapacitor module satisfies one or more of the following conditions upon being subjected to a vibration profile in accordance with ISO 16750-3-2012, Table 12 and IEC 60068-2-64: a capacitance within a rated capacitance value as determined in accordance IEC 62391-1, Method 1A, an equivalent series resistance within a rated equivalent series resistance value as determined in accordance IEC 62391-1, a leakage current within a rated leakage current value as determined in accordance IEC 62391-1, an operating voltage with a rated operating voltage value.

2. The ultracapacitor module of claim 1, wherein one or more of the conditions is satisfied after subjecting the ultracapacitor module to the vibration profile in two different orientations.

3. The ultracapacitor module of claim 1, wherein one or more of the conditions is satisfied after subjecting the ultracapacitor module to the vibration profile in three different orientations.

4. The ultracapacitor module of claim 1, wherein the top enclosure member and the bottom enclosure member are connected to each other via at least two interlocking mechanisms along each side surface of the enclosure.

5. The ultracapacitor module of claim 1, wherein both the top enclosure member and the bottom enclosure member include at least one individual opening through which the at least one ultracapacitor is provided.

6. The ultracapacitor module of claim 1, wherein each of the ultracapacitors of the plurality of ultracapacitors is provided through an individual opening in at least one of the top enclosure member and the bottom enclosure member.

7. The ultracapacitor module of claim 1, wherein the perimeter of the opening includes an adhesive such that the ultracapacitor contacts the adhesive.

8. The ultracapacitor module of claim 1, wherein adjacent ultracapacitors are electrically connected to each other using an interconnect.

9. The ultracapacitor module of claim 8, wherein the interconnect is laser welded to the ultracapacitor.

10. The ultracapacitor module of claim 8, wherein the interconnect includes a hole for receiving a fastener.

11. The ultracapacitor module of claim 8, wherein an adhesive is provided between the interconnect and a surface of the ultracapacitor.

12. The ultracapacitor module of claim 1, wherein the enclosure includes a first cover layer on the top surface, the bottom surface, or both of the ultracapacitor module.

13. The ultracapacitor module of claim 12, wherein the first cover layer includes holes, wherein a fastener connects the first cover layer to an interconnect electrically connecting adjacent ultracapacitors.

14. The ultracapacitor module of claim 12, wherein the first cover layer is a circuit board including a balancing circuit.

15. The ultracapacitor module of claim 12, wherein the first cover layer is secured to the respective top enclosure member or bottom enclosure member using a fastener.

16. The ultracapacitor module of claim 12, wherein an adhesive is provided along the perimeter of the first cover layer such that the adhesive is present between the first cover layer and the respective top enclosure member or bottom enclosure member.

17. The ultracapacitor module of claim 12, wherein a second cover layer is provided on the first cover layer.

18. The ultracapacitor module of claim 17, wherein the second cover layer includes at least one strengthening member.

19. The ultracapacitor module of claim 17, wherein the second cover layer includes an interlocking mechanism for interlocking with the respective top enclosure member or bottom enclosure member.

20. The ultracapacitor module of claim 17, wherein the second cover layer is secured to the respective top enclosure member or bottom enclosure member using a fastener.

21. The ultracapacitor module of claim 17, wherein a cushioning member is presented between the ultracapacitors and the second cover layer.

22. A vehicle incorporating the ultracapacitor module of claim 1, wherein the vehicle is a transportation vehicle, an industrial vehicle, or a military vehicle.

23. A robot incorporating the ultracapacitor module of claim 1.

24. The ultracapacitor module of claim 1, the enclosure further comprising a side enclosure member secured to the top enclosure member and/or the bottom enclosure member.

25. An ultracapacitor module comprising:
an enclosure including a top enclosure member and a bottom enclosure member connected to each other via at least one interlocking mechanism, a first cover layer on a top surface of a plurality of ultracapacitors housed within the enclosure wherein at least one ultracapacitor of the plurality of ultracapacitors is secured to the enclosure, a second cover layer on the first cover layer wherein the second cover layer is secured to the first cover layer and/or the top enclosure member,
wherein the ultracapacitor module satisfies one or more of the following conditions upon being subjected to a vibration profile in accordance with ISO 16750-3-2012, Table 12 and IEC 60068-2-64: a capacitance within a rated capacitance value as determined in accordance IEC 62391-1, Method 1A, an equivalent series resistance within a rated equivalent series resistance value as determined in accordance IEC 62391-1, a leakage current within a rated leakage current value as determined in accordance IEC 62391-1, an operating voltage with a rated operating voltage value.

* * * * *